US005107677A

United States Patent [19]

Ribaudo

[11] Patent Number: 5,107,677

[45] **Date of Patent: * Apr. 28, 1992**

[54] HYDRAULIC DOOR ACTUATOR

[75] Inventor: Nicholas Ribaudo, Boca Raton, Fla.

[73] Assignee: Vertran Manufacturing Company, Deerfield Beach, Fla.

[ * ] Notice: The portion of the term of this patent subsequent to Mar. 27, 2002 has been disclaimed.

[21] Appl. No.: 387,979

[22] Filed: Jul. 31, 1989

Related U.S. Application Data

[63] Continuation-in-part of Ser. No. 53,144, May 21, 1987, Pat. No. 4,910,961.

[51] Int. Cl.[5] .............. F16D 31/02

[52] U.S. Cl. .............. 60/473; 91/357; 91/409

[58] Field of Search .............. 91/357, 400, 401, 402, 91/408, 409; 60/473, 476

[56] References Cited

U.S. PATENT DOCUMENTS

| | | | |
|---|---|---|---|
| 1,278,863 | 9/1918 | Crusius | 137/533.11 |
| 1,301,757 | 4/1919 | Steffes | 91/409 |
| 1,712,089 | 5/1929 | Miles . | |
| 1,754,563 | 4/1930 | Lang . | |
| 2,202,836 | 6/1940 | Coupland . | |
| 2,212,998 | 8/1940 | Crane | 60/52 |
| 2,927,429 | 3/1960 | Carlson | 60/903 |
| 2,954,755 | 10/1960 | Pecchenino . | |
| 3,043,277 | 7/1962 | Carlson . | |
| 3,592,106 | 7/1971 | Baughman | 91/409 |
| 4,089,251 | 5/1978 | Louviot | 91/408 |
| 4,118,931 | 10/1978 | Nornenmacher . | |
| 4,140,044 | 2/1979 | Biller et al. | 91/408 |
| 4,151,784 | 5/1979 | Fussangel | 91/408 |
| 4,296,570 | 10/1981 | Balbach et al. . | |
| 4,399,653 | 8/1983 | Pylat, Jr. . | |
| 4,642,986 | 2/1987 | Chatelin . | |
| 4,685,537 | 8/1987 | Kappenhagen . | |
| 4,696,163 | 9/1987 | Glomeau . | |
| 4,735,292 | 4/1988 | Munz | 60/476 |
| 4,910,961 | 3/1990 | Ribaudo | 91/357 |

FOREIGN PATENT DOCUMENTS

| | | | |
|---|---|---|---|
| 0004483 | 3/1979 | European Pat. Off. | 91/408 |
| 0032300 | 7/1981 | European Pat. Off. . | |
| 0158421 | 10/1985 | European Pat. Off. . | |
| 0215264 | 3/1987 | European Pat. Off. . | |

*Primary Examiner*—Edward K. Look
*Assistant Examiner*—F. Daniel Lopez
*Attorney, Agent, or Firm*—Kenyon & Kenyon

[57] ABSTRACT

An improved hydraulic door actuator comprising a hydraulic fluid pump having first and second ports; integral operating cylinder and fluid control apparatus including a barrel coupled at each end to the first and second ports of the hydraulic fluid pump; a piston fluidly sealed within the barrel; and means for controlling the flow of fluid of the hydraulic fluid pump to and from the barrel disposed between the barrel and the first and second ports such that the door automatically slows to a stop upon opening or closing wherein the fluid flow control means comprises a plurality of openings disposed along the length of the barrel for bypassing pressurized fluid from the barrel.

34 Claims, 16 Drawing Sheets

ROTARY GEAR PUMP
7
8
9
10
11
12
13
14
15
16
17
18
19
20
21
22
23
24
25
26
27
28
29
30

ROTARY GEAR PUMP
8
9
10
11
12
13
14
15
16
17
18
19
20
21
22
23
24
25
26
27
28
29
30

HYDRAULIC DOOR ACTUATOR

This application is a continuation-in-part of U.S. Ser. No. 053,144 filed May 21, 1987, Pat. No. 4,910,961.

BACKGROUND OF THE INVENTION

1. Technical Field

This invention relates to the field of designing closure apparatus for overhead sliding doors and, more particularly, to a hydraulic door opening or closing device.

2. Description of the Prior Art

In the early part of the twentieth century, elevator door closures were recognized to be too abrupt and too prone to cause accidents to cargo or passengers. Consequently, door closers and check devices involving liquid-filled cylinders or, alternatively, pneumatic enclosures for spring-loaded devices were developed to rectify the abrupt closure and safety problems.

Typical of this early art is U.S. Pat. No. 1,712,089 which issued May 7, 1929 for an Elevator Door Actuating Mechanism. There is shown in FIG. 7 a horizontal operating cylinder pressing against a spring. Fluid is supplied to the cylinder through a valve such that the cylinder opens and closes an elevator gate. Further, a dash pot is suggested to retard the downward movement of the valve as the gate is completely closed.

Eventually it was discovered that a hydraulic fluid-filled cylinder could be sequentially emptied and filled so as to drive a door opening and closure. For example, in U.S. Pat. No. 1,754,563, a valved cylinder drives a piston by fluid pressure and a dash pot retards the final closing of the door.

Today, power elevator car and hoistway doors typically utilize AC motors and various linkages of such motors with gear boxes, checks, pulleys, and so on to provide motion for power door operation. Generally, power door openers using single speed AC motors provide a constant opening and closing speed checked and slowed by air or oil checks. The air and oil check speed control arrangements must be particularly adjusted and often require supplemental control arrangements. Furthermore, AC motor systems are complicated to construct and comprise a large number parts. Many of these parts are susceptible to wear and require frequent maintenance.

With the advent of synchronous DC motors as applied to the opening and closure of elevator sliding doors, the early work in the field of hydraulics and pneumatics was not further advanced. The application of such DC motors for door opening and closure, however, advanced the degree of door control, in particular, the ability to change door opening and closing speeds and to provide a responsiveness to external stimulae, such as electric eye detection of entry and egress, control panel button selection, or control signals from a central elevator or elevator bank control system. In order to accomplish this new control and responsiveness, the complexity of such DC motor arrangements is substantially increased, especially the amount of switching and motor control hardware required. Speed control is especially complicated by the typical provision of special control systems for adjusting the speed output of the DC motors and, thus, the door opening and closing speeds.

In light of the above, it has become desirable to provide a speed-controlled door opening device that is as efficient as the known DC motor controlled arrangements, but which greatly reduces the amount of hardware required and, especially, the number of individual piece parts, and which can be factory-adjusted before shipment to the customer, reducing the installation time.

SUMMARY OF THE INVENTION

The above-stated problems and related problems of the prior art are solved with the principles of the present invention, a hydraulic actuator device operatively connected to at least one, preferably two, doors comprising a fluid pump in communication with a hydraulic circuit.

In particular, the integral operating cylinder and fluid control apparatus includes a barrel coupled at each end to the first and second ports of the hydraulic fluid pump, a piston fluidly sealed within the barrel and coupled to the door and a means for controlling the flow of fluid of the hydraulic fluid pump to and from the first and second ports. By controlling the flow of fluid the door automatically slowed to a stop upon opening or closing.

The means for controlling the flow of fluid further includes two manifolds containing a plurality of valved openings linearly disposed along the length of the barrel. While one manifold is being pumped fluid and provides a directional piston movement, at a predetermined point, the other manifold automatically converts from a directional device to a speed checking device in stepped, sequential fashion until eventually the door comes to a complete slow stop either in a fully open or closed position. Consequently, the present arrangement comprises an inherent door speed control arrangement without any requirement for additional speed control-related circuits or systems.

The device is coupled to a control circuit providing three modes of door operation: door opening, door closing and door reversing, in particular, from closing to opening operation. The present control circuit is not concerned with speed control. Consequently, the associated circuitry is simplified and, in particular, can be constructed in plug-in modular circuit board form. The control circuit comprises a pair of microswitches signaling a fully extended or fully retracted position of the piston rod and a plurality of plug-in relays activating; a reversible rotation of the hydraulic fluid pump depending on the mode of door operation. Furthermore, the control system includes a timer for shutting down the pump motor in the event door travel is restricted by mechanical means for an unduly long period.

The present invention provides a door opening or closing device comprising a) a hydraulic fluid pump having first and second ports; b) integral operating cylinder and fluid control apparatus including: i. a barrel coupled at each end to the first and second ports of the hydraulic fluid pump; ii. a piston fluidly sealed within the barrel; and iii. means for controlling the flow of fluid of the hydraulic fluid pump to and from the barrel disposed between the barrel and the first and second ports such that the door automatically slows to a stop upon opening or closing wherein the fluid flow control means comprises a plurality of openings linearly disposed along the length of the barrel for bypassing pressurized fluid from the barrel.

DETAILED DESCRIPTION

Figure 1:
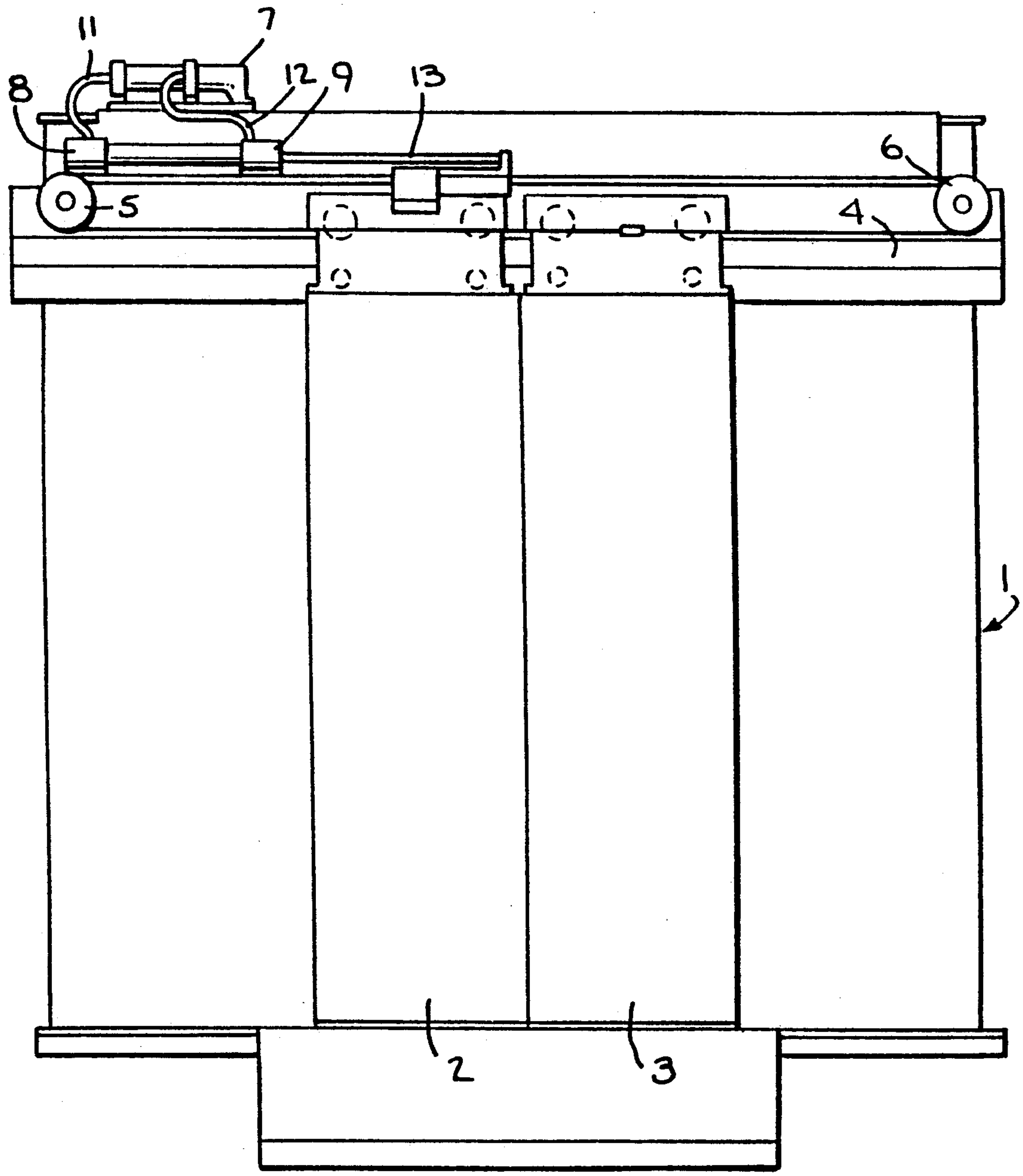
FIG. 1 is a front view of an elevator car having center opening sliding doors showing installation of the present hydraulic door opening or closing device on top of the car.
Figure 2:
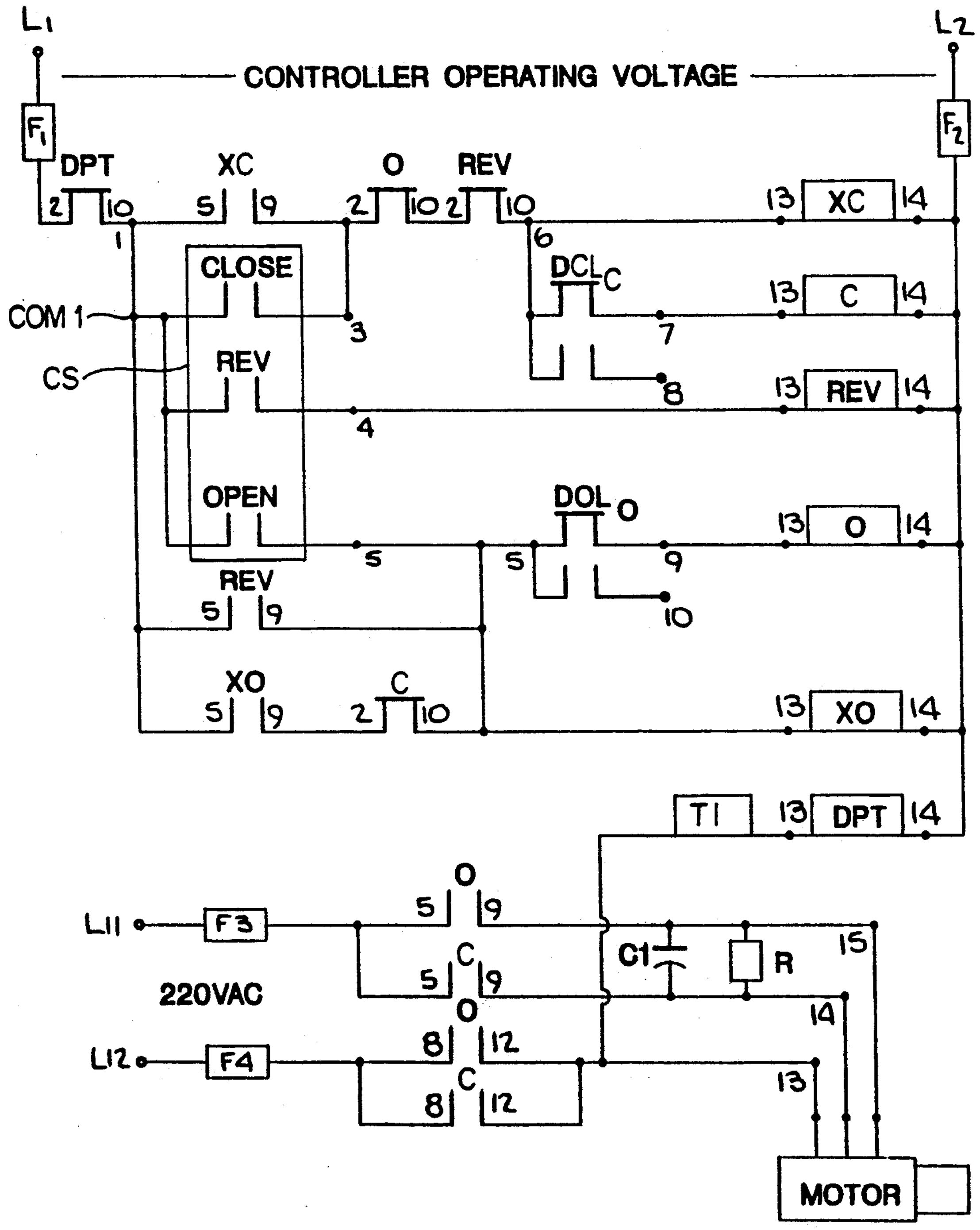
FIG. 2 is a schematic diagram of a control circuit controlling the operation of the hydraulic door opening or closing device of FIG. 1.

In FIGS. 1 to 11B similar elements have been identified with the same reference numerals or characters wherever possible. The hydraulic door opening or closing device of the present invention is particularly shown in FIG.'s 1 and 3 to 11B, while a control circuit for the hydraulic door opening or closing device is shown in FIG. 2.

Referring more particularly to FIG. 1, there is shown a front view of an elevator car 1 having sliding doors 2, 3 which close in the center of the car hung on a track 4. Pulleys 5, 6 are arranged on each side of the top of the elevator car 1 such that a left-hand door 2 is drawn to the left while a right hand door 3 is drawn to the right upon opening. The doors are hung from track 4 and guided along the track by upper and lower roller sets.

Some elevator car sliding doors comprise two pairs of doors opening from one side to the other. In such a case, the door that must travel the farthest to open is typically geared so that it travels twice as fast as the other. Such an arrangement is not shown in the drawings nor are other arrangements well known in the art. However, all such arrangements may be easily adapted for application of the present device and the center sliding door arrangement shown is merely exemplary of such arrangements. Furthermore, the present hydraulic door opening or closing device is equally suited to application in any door system such as those installed in train cars or as warehouse doors.

The hydraulic door opening or closing device comprises a rotary gear pump motor 7 having two ports which, responsive to a change in power feed, pumps in reverse direction. That is, at one point in time, hydraulic fluid line 12 connected to one port may be a pressure line while fluid line 11 connected to the other port will be a suction line and, upon a change in power feed, fluid line 11 becomes a pressure line and line 12 becomes a suction line.

One such pump which may le employed is available from Hy Pack (div. of WEAVER Corp.) which may be driven by a Franklin Electric Model 1903180400 PR1, a 220 volt, single phase motor rated at 425 watts with a full load. This Franklin Electric motor requires a run capacitor C1 of approximately fifteen microfarads. Resistor R1 (15,000 ohm, watt) is installed across the terminals of capacitor C1 to bleed charge from the capacitor reducing arcing of the contacts during rapid cycling.

Fluid line 11 couples pump motor 7 to a first manifold 8 which drives a piston 14 inside cylinder or barrel 10 to close doors 2 and 3 via rod 13. Rod 13 is attached in a well known manner to the doors 2 or 3 and is most conveniently in a line approximately parallel to the line of directional door movement represented, for example, by the track 4. Ideally, the pump motor 7 and its connection to the barrel 10 should be arranged so that the fluid lines 11, 12 are as short as possible.

Referring more particularly to FIG. 2, there is shown a control circuit for the hydraulic door opening or closing device shown in FIG. 1 which will be further explained by aid of FIGS. 3 to 10 showing the hydraulic door opening or closing device in operation. The control circuit of FIG. 2 is connected via fuses F1 and F2 and terminals L1, L2 to a controlled operating voltage that is chosen appropriately for operating parallel-connected relays: XC, C, REV, 0, and XO which, in turn are connected in series via relay DPT with one power feed line to the pump motor 7.

Power for pump motor 7 is provided via fuses F3 and F4 and 220 VAC single phase line terminals L11 and L12. As will be subsequently explained, a reversal of pump motor 7 is accomplished by an alternate feeding of power via terminal M14 or terminal M15 of motor 7 while terminal M13 of motor 7 is always coupled to line terminal L12.

The relays employed in the practice of this invention, e.g., relays 0, C, XC, REV, XO and DPT, may be KU Series, Plug-in type relays available from Potter & Brumfield.

Microswitches DOL and DCL are mounted in relationship to rod 13 such that switch DOL identifies a fully retracted or door open position while switch DCL identifies a fully extended or door closed position. An example of a commercially available microswitch useful in the practice of this invention is Burgess At. No. CT2KR2-A2.

Timer circuit T1, e.g., Potter & Brumfield Type CB, is connected in series with relay DPT such that, in accordance with a timing constant, power holding either the relays O or C actuated is cut off via normally closed contacts DPT 2, DPT 10 after a predetermined timing interval. Consequently, power feeding pump motor 7 is cut off in extraordinary situations as will be described in greater detail herein.

The control circuit of FIG. 2 may be most conveniently implemented in tho form of a single printed circuit board equipped with plug-in relays, fuses, microswitch contacts and other components, greatly reducing the amount of separate components required by the present invention.

Generally the control circuit shown in FIG. 2 provides three modes of operation of the hydraulic door opening or closing device of FIG. 1: a door opening mode, a door closing mode and a door reversing mode such that upon certain conditions, a door closing is reversed to a door opening operation. These three modes of operation will be explained in greater detail with reference to FIGS. 3 to 10 showing the present hydraulic door opening or closing device in various stages of operation. Signals relating to a selection of a particular mode are intercepted at control signal terminal CS.

Referring briefly and collectively to FIGS. 3 to 10, there is shown in each FIG. rotary gear pump 7 coupled to first and second manifolds 8 and 9 via hydraulic fluid lines 11 and 12 respectively, cylinder or barrel 10 and rod 13 as shown in FIG. 1. As clearly shown in FIGS. 3 to 10, rod 13 is coupled to a piston head 14 driven within barrel 10 by fluid pressure. Fluid lines 11 and 12 each branch into two branch lines. Branch lines 15 and 16 are connected to opposite ends of barrel 10 via two directional flow valves 17 and 18 respectively. The other branch lines 19 and 20 each run to a plurality of ball valves linearly spaced along each end of barrel 10. First manifold 8 comprises five such ball valves 21 to 25 and second manifold 9 also comprises five such ball valves 26 to 30. Each such ball valve is fluidly coupled between an associated branch line and the barrel 10 via a ball such that in a down position an opening to barrel 10 is closed and in an up position fluid flow is permitted between barrel 10 and an associated branch line in accordance with a screw adjustment as will be more particularly described in a discussion of FIGS. 11A and 11B.

In particular, branch line 19 parallels barrel 10 in the vicinity of ball check valves 21 to 25. Depending on the position of piston 14, these ball check valves 21 to 25 provide a fluid bypass to a flow of fluid via branch line 15. In a similar manner, ball check valves 26–30 provide a fluid bypass to a flow of fluid via branch line 16. Useful flow control check valves are commercially available, e.g., Detroit Fluid Products part no. EC10B.

It can be seen in the FIGS. that ball check valves 21 to 25 and 26 to 30 and ports 21' to 25' and 26' to 30' (FIG. 12) provide a pair of sets of ports in communication with the interior of the cylinder. Each set of ports extends for a predetermined distance along the length of the cylinder and is spaced from opposite end portions of the cylinder toward a central portion thereof. The ports of each of the sets are uncovered when the piston is in a rest position adjacent one of the different opposite end portions of the cylinder. The collective or cumulative flow path defined by the ports of each set has an area which is a multiple of the area of the flow path of a different one of the passages in communication with the interior of the cylinder. Means for alternately connecting one of the passages and one set of the ports adjacent thereto to a source of high fluid pressure while connecting the other of the passages and the other set of ports adjacent thereto to a low fluid pressure are provided. The piston in response to the high fluid pressure connected to one of the passages is initially moved from a rest position adjacent one end of the cylinder toward the central portion of the cylinder while the one set of ports spaced adjacent to the one end position of the cylinder is adapted to bypass a portion of the flow from the source of high fluid pressure around the piston. The piston when subsequently moved to intersect successively the ports of the one set of ports progressively reduces the bypassing of the portion of the flow and thereby accelerates within the cylinder. The piston when moving into the central portion of the cylinder and progressively beyond the ports of the one set of ports reaches a maximum velocity. The piston when successively intersecting the ports of the other set of ports is subjected to a deceleration by fluid bypass pressure resulting from the flow of high pressure fluid through the other set of ports being successively intersected by the piston, and the piston when being decelerated moves to the other end portion of the cylinder to a rest position adjacent thereto.

It will be further appreciated that the cylinder may be provided with closed wall portions, i.e., portions free from bypass passages, extending for a predetermined distance from a different opposite end portion thereof toward a central portion of the cylinder forming dwell regions.

Figure 3:
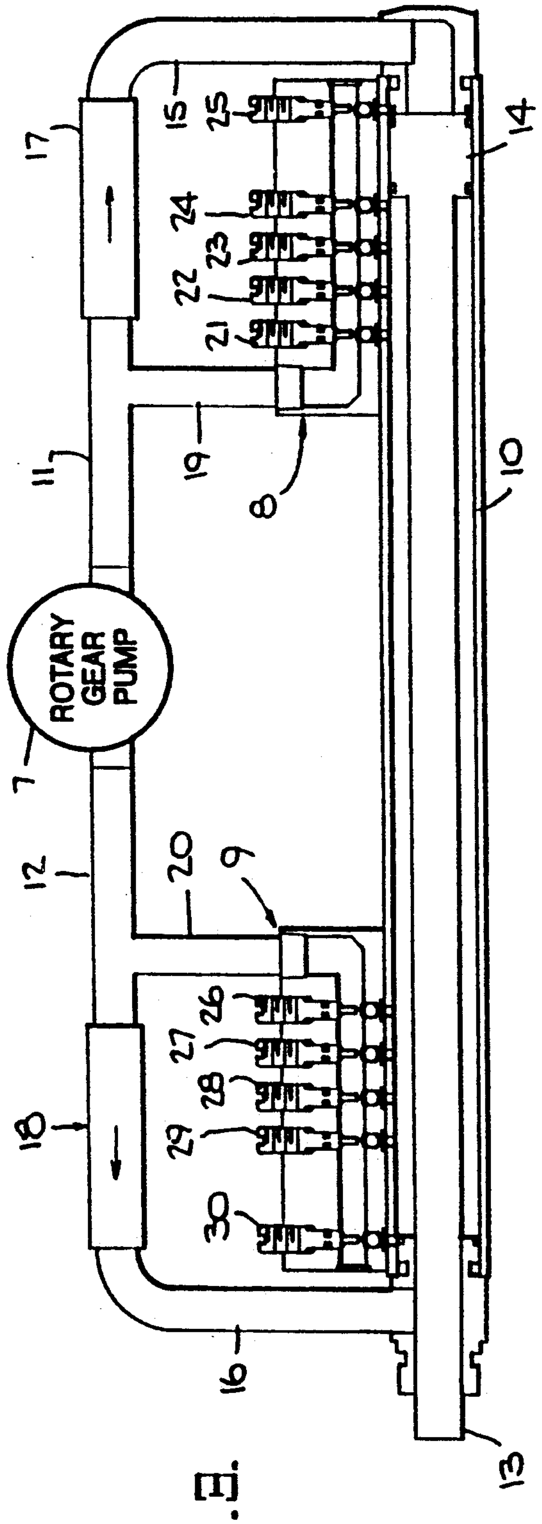
FIG. 3 is a front view of the hydraulic door opening or closing device of FIG. 1, a horizontal cylinder or barrel being shown in cross-section exposing a horizontal rod and a piston in fully retracted position and first and second manifolds each comprising a plurality of ball check valves, the ball check valves of the first or left-most manifold shown in a raised or open position and the ball check valves of the second or right-most manifold shown in a lowered or closed position.
Figure 11A:
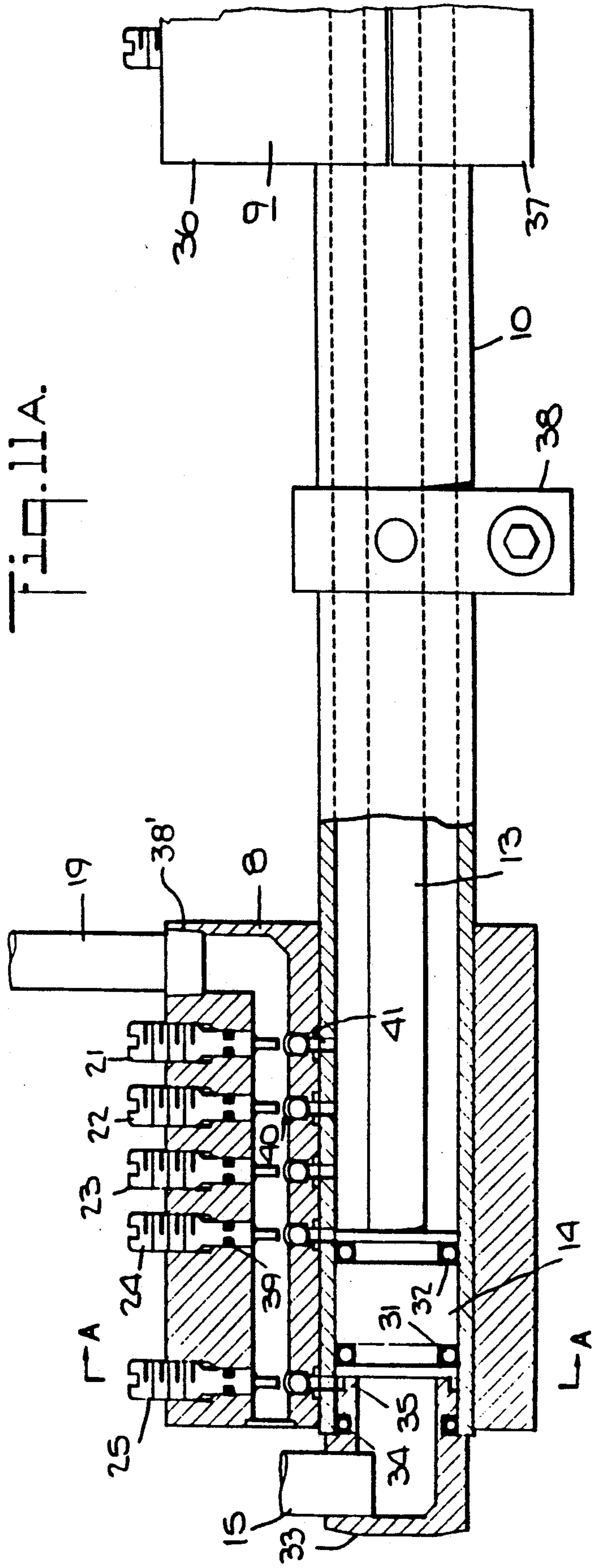
FIG. 11A is a detailed front cross-sectional view of one manifold of the hydraulic door opening or closing device of FIG.'sto 10, showing adjustment screws for the plurality of ball check valves of the manifold.
Figure 11B:
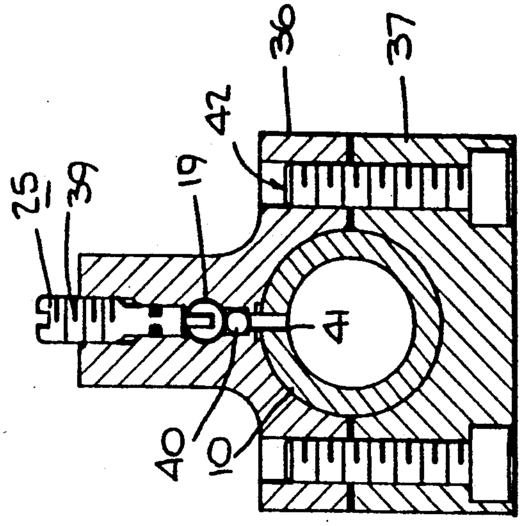
FIG. 11B is a lateral cross-sectional view along the axis A—A of FIG. 11A.

The only wearing parts associated with the device of FIG. 3 are two sets of O-rings, one set for the piston 14, and the other set for the sealing of rod 13 at the branch line 16 end of the barrel 10. Consequently, the present device is easily maintained once installed. Referring briefly to FIG. 11A and 11B, ball valves 21 to 30 may be preadjusted by way of set screws 39 for a particular sliding door operation before the device is shipped to the destination of its intended application.

Referring now to FIGS. 2 to 10, the operation of the present device will be explained in detail. It will be assumed that, for the purposes of this discussion, the pump motor 7 and barrel 10 have undergone a door opening operation, that the pump system is primed and that all the air has been purged from the barrel 10, the manifolds 8 and 9 and the hoses 11, 12, 15, 16, 19, 20.

Referring briefly to FIG. 2, a command signal to close the elevator doors is generated from a main elevator control panel, typically in an elevator machine room (not shown). The command signal is transmitted to the control circuit of FIG. 2 via control signal terminal CS. The receipt of the control signal at terminal CS closes the contacts CLOSE between terminals COM 1 and CS3. This is accomplished, for example, by relay actuation.

The contacts CLOSE of terminal CS being closed, an electrical path is formed via terminal L1, fuse F1, closed contacts DPT2 and DPT10, normally closed contacts O2 and O10, and normally closed contacts REV2 and REV10 to the parallel connection of hold closed relay XC with close relay C via normally closed door close limit switch DCL contacts DCL6 and DCL7.

With the operation of hold closed relay XC, associated relay contacts XC5 and XC9 are closed temporarily holding relay XC actuated after the close contacts CLOSE of terminal CS are opened. As can be seen by the series connection of contacts XC5, XC9, O2, O10, REV2, and REV 10, either the actuation of the open relay O or the reverse relay REV will release relay XC.

At the same time, close relay C is actuated via the normally closed contacts DCL6, DCL7 of door close limit switch DCL. Normally open close relay contacts C5, C9 now close a path providing power via terminal L11 and terminal M14 to pump motor 7 and via close relay contacts C8, C12 to power terminal L12. The power connection of motor terminals M14, M13 ensures that the pump motor 7 runs in such a direction as to close the elevator doors. Upon closure of either O8 or O12 or C8 and C12 the applied voltage from line 12 is connected to the line side of delay time T1. If either of the O or C relays are energized longer than the time constant value for TI then the DIT relay is energized.

Referring now to FIG. 3, the rotary gear pump 7 establishes a pressure in fluid line 11 and a suction in fluid line 12. Fluid is at first pumped through directional flow control valve 17 into the barrel 10 by way of branch line 15.

At the same time, since there is pump pressure in the branch line 19 to first manifold 8, the ball check valves 21 to 25 of the first manifold 8 are forced into a down or closed position eliminating any fluid flow toward the pump motor via this manifold at this time.

Consequently, pump motor fluid flow is diverted by way of flow valve 17 and through line 15 into the end of the barrel 10. Piston 14 is forced away from this end of the barrel 10 simultaneously causing an extension of the rod 13.

Figure 4:
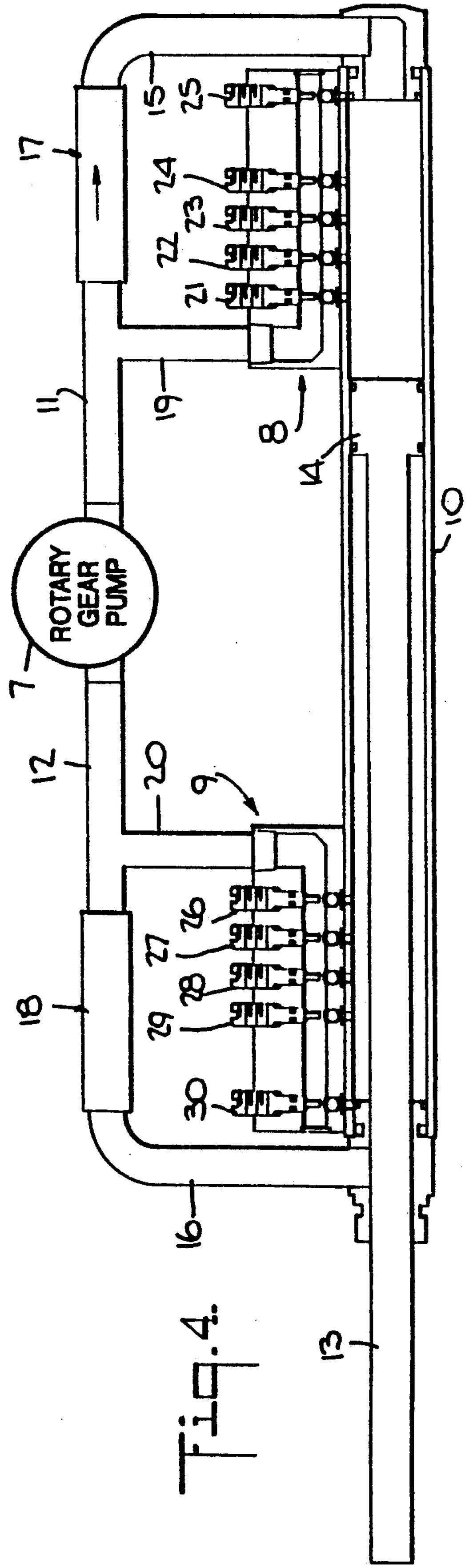
FIG. 4 is a front view of the hydraulic door opening or closing device of FIG. 3, the rod and piston in partially extended position.

Referring now to FIG. 4, once the barrel 10 has begun to pressurize at its other end and the piston 14 begins to move, the ball checks 26 to 30 in the second manifold 9 are forced upward into their open positions. This opening of ball check valves 26 to 30 of the second manifold 9 provides a path via branch line 20 for exhaust fluid from the previous cycle of barrel/piston operation. At this point in time, the flow control valve 18 for the branch line 16 has not been actuated. There is no flow of hydraulic liquid in line 16.

Figure 5:
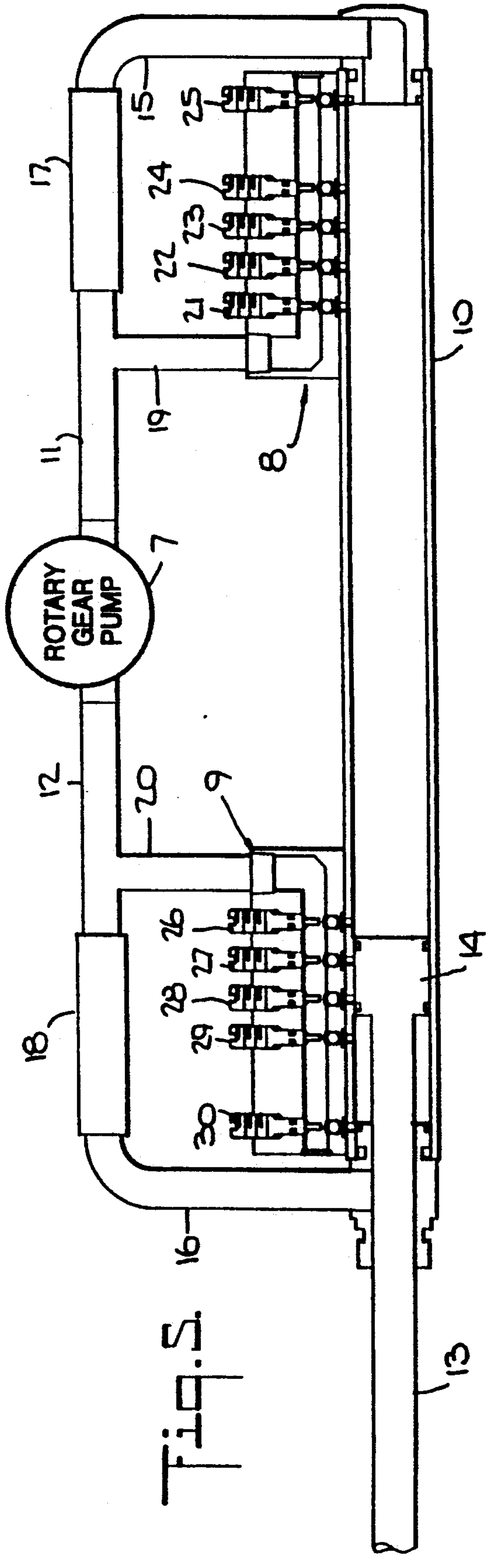
FIG. 5 is a front view of the hydraulic door opening or closing device of FIG. 3, the rod and piston in mostly extended position.

Referring now to FIG. 5, the piston 14 and rod 13 have traveled outward at a constant velocity driven by the continuous operation of pump motor 7. When the pressurized side of piston seal 14 passes the first opening in the wall of the barrel 10 to the first ball check valve 26, the velocity of the piston 14 and rod 13 reduces. This reduction in piston velocity relates to a reduction in pressure on the drive side of piston 14 caused by a portion of the hydraulic fluid under pressure being bypassed directly back to the pump motor 7 via branch line 20 and fluid line 12. A further decrease in piston velocity follows as the piston 14 passes each ball check valve 27 to 29. Without the aid of any external speed control arrangement, the second manifold 9 automatically converts to a bypassing operation from a completely directional operation providing an inherent speed control.

Figure 6:
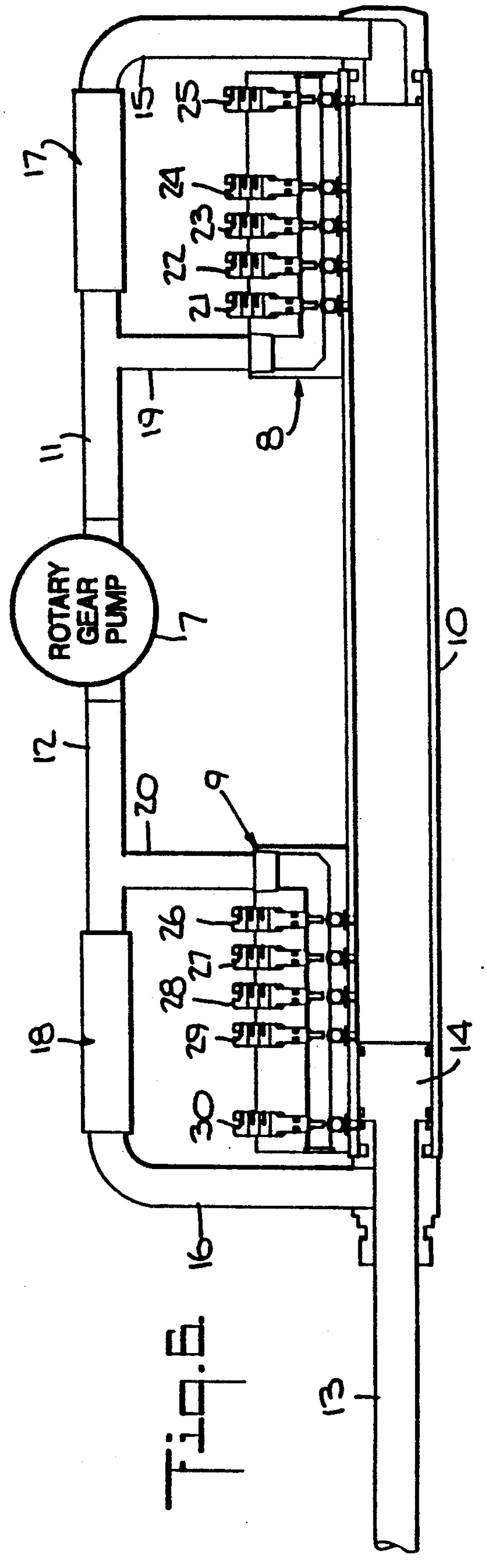
FIG. 6 is a front view of the hydraulic door opening or closing device of FIG. 3, the rod and piston in fully extended position, the ball check valves in the same position as is shown in FIG. 3.

Referring to FIG. 6, by the time piston 14 passes ball check valve 29, valves 26 to 29 are all bypassing fluid back to pump motor 7 and only ball valve 30 is releasing fluid pressure on the driven side of the piston 14. With this slow release of fluid through ball valve 30 there is a correspondingly slow directional movement of piston 14. Consequently, by far the majority of the hydraulic fluid transmitted via line 11 is being bypassed through the reservoir formed in the barrel 10 directly back to the pump motor 7 when the piston 14 is near the end of its travel distance.

In other words, each time a ball check valve of the valves 26 to 29 of manifold 9 is passed, the piston 14 and rod 13 undergo an approximately constant decrease in velocity given a particular preset adjustment of set screws of the valves 26 to 29. Adjustment of the set screws 39 (FIGS. 11A and 11B) for valve 30 will establish a final slow speed to stop motion of the piston rod 13. This adjustment must take into consideration the inertia generated by varying weights of different door configurations, sizes and materials used to fabricate the doors. However, if these are known, as suggested previously, all settings can be preset during the manufacture of the present device.

Referring again to FIG. 2, after the rod 13 is totally extended, the door close limit switch DCL is mechanically actuated. Normally closed contacts DCL6, DCL7 open at this time de-energizing close relay C. This de-energization of close relay C results in the opening of close relay contacts C5, C9, C8, C12 turning power off to pump motor 7.

Despite the de-energization of close relay C, parallel connected relay XC does not de-energize as its hold up path is still preserved. Consequently, relay XC provides a latching memory circuit which safeguards against opening, for example, passengers pulling the car door open while the elevator is in motion or a condition known as door sag, an unintentional, premature opening (or closing) of the doors. In such situations, the door close microswitch contacts DCL6 and DCL7 return to their normally closed position energizing close relay C and turning power back on feeding pump motor 7 via motor terminals M13 and M14. In this manner, the correct, closed door position is maintained until a command to open is transmitted to control signal terminal CS.

Now the door opening mode of operation will be described. Referring again to FIG. 2, a command signal to open the elevator door is transmitted to control signal terminal CS from the main elevator controller. As a result, open contacts OPEN are closed and a path is established by line terminal L1 through normally closed switch DOL energizing open relay 0.

At the same time, hold open relay XO is energized holding open relay O and hold open relay XO energized. This holding open is caused by way of the closure of normally open hold open relay contacts XO5 and XO9.

Figure 7:
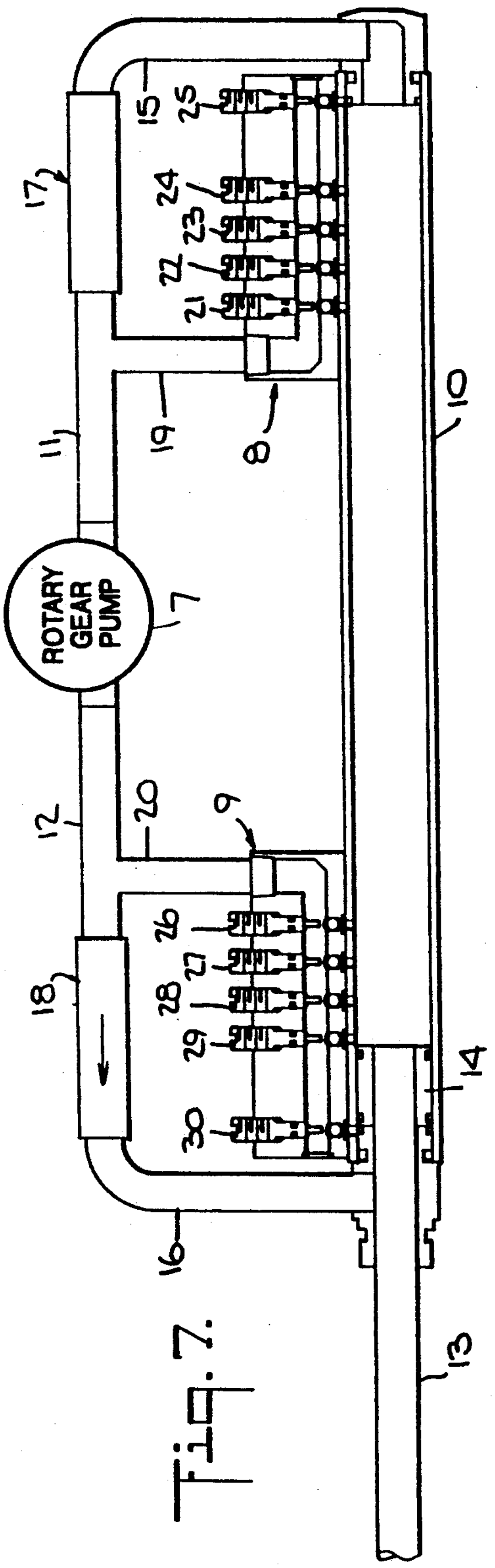
FIG. 7 is a front view of the hydraulic door opening or closing device of FIG. 3, the rod and piston in fully extended position, the ball check valves of the first or left-most manifold shown in a lowered or closed position and the ball check valves of the second or right-most manifold shown in a raised or open position.

With the energization of open relay O, its corresponding normally open contacts 05, 09, 08, 012 are closed. Power is thus fed to pump motor 7 via motor contacts M15, M13 and the pump motor operates in reverse rotation. Referring to FIG. 7, a pressure is created in fluid line 12 while a suction is created in fluid line 11. Consequently, fluid is now pumped through directional flow control valve 18 by way of branch line 16 into the end of barrel 10. Fluid also presses into branch line 20 and into second manifold 9.

Because of the increased pressure in the second manifold 9 and the pressure in the first manifold 8 is only residual pressure subject to exhaust back to suction line 11, the several ball check valves 26 to 30 in the second manifold 9 are forced into their closed or down position. In particular, this is accomplished by the effects of the pump motor pressure applied to the surface area of the balls of the ball check valves 26 to 30 on the manifold side of the balls as compared with the reduced pressure effects on the surface area of the barrel side of the balls via the small holes in the barrel wall.

Figure 8:
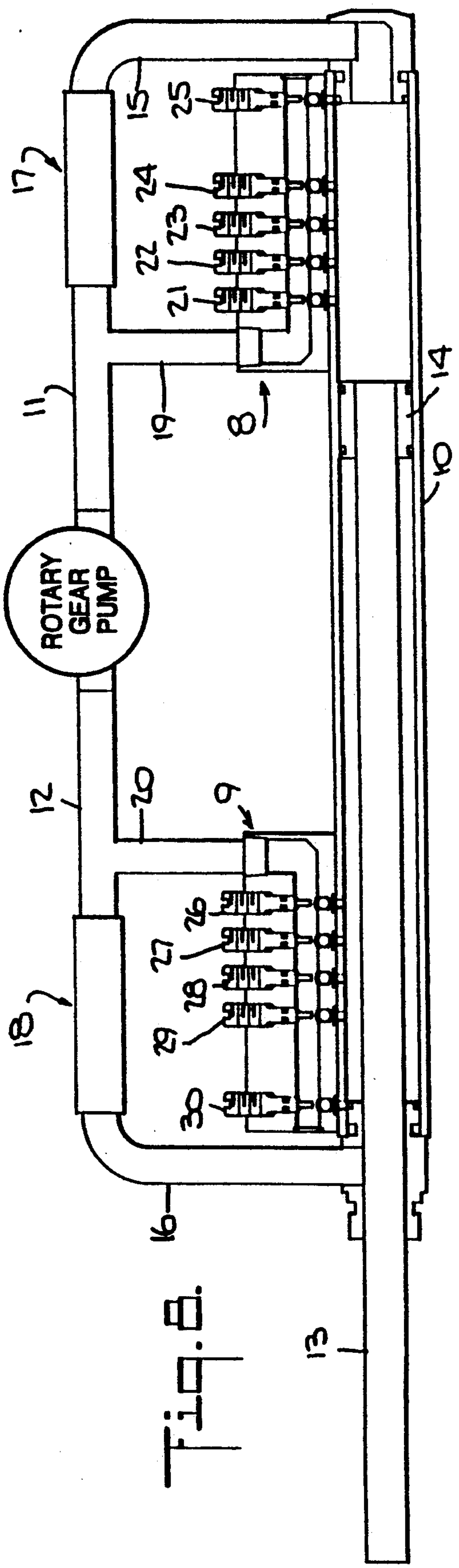
FIG. 8 is a front view of the hydraulic door opening or closing device of FIG. 3, the rod and piston in partially retracted position.

Referring now to FIG. 8, as the device pressurizes, the fluid from pump motor 7 flows through line 12 via flow valve 18 and branch line 16 into the barrel 10. The ball valves 26 to 30 all being closed, the piston 14 is forced to retract and the rod 13 is driven inward.

At the same time, all the ball valves 21 to 25 of the first manifold 8 are forced to open and their associated balls are shown in an uppermost position due to the exhausting of the fluid from the barrel 10 from the already described close cycle. The fluid returns via first manifold 8, branch line 19, and fluid line 11 to pump motor 7.

There is no fluid flow through directional flow control valve 17 at this time. All the fluid exhausts via ball check valves 21 to 25.

Figure 9:
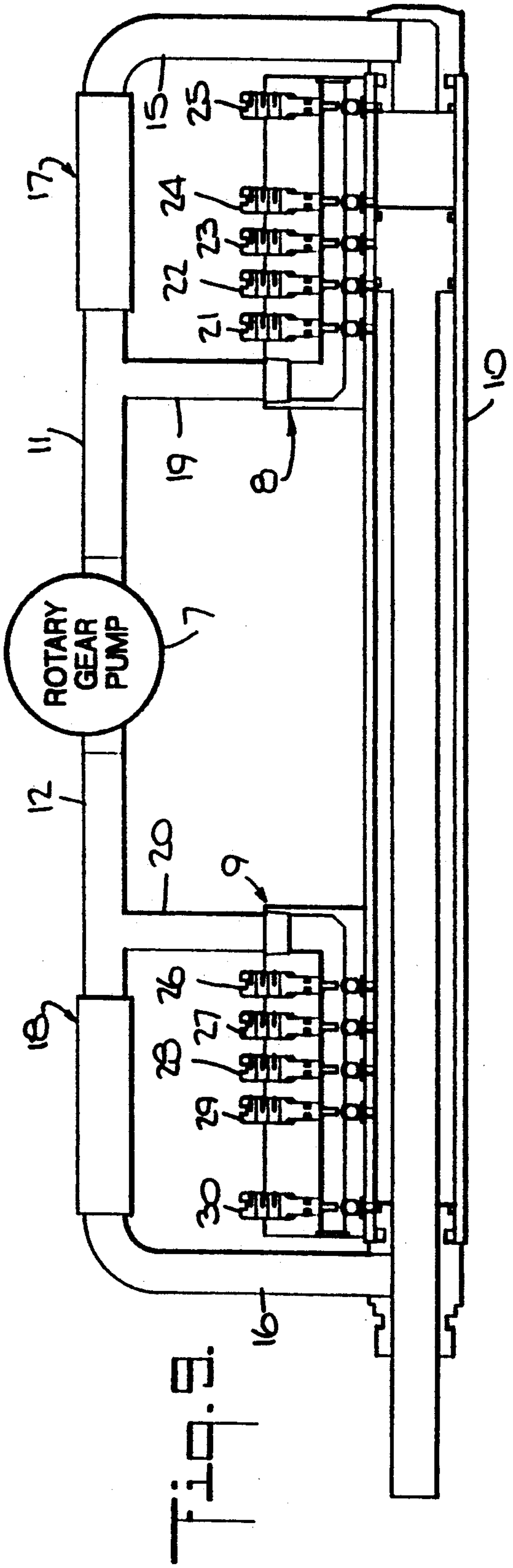
FIG. 9 is a front view of the hydraulic door opening or closing device of FIG. 3, the rod and piston in mostly retracted position.

Referring to FIG. 9, the piston 14 and rod 13 continue to retract at a relatively constant velocity. As soon as the pressurized side of the piston passes the first ball check valve 21 of the first manifold 8, a portion of the pressurized fluid can bypass via open ball check valve 21 and branch line 19 directly to rotary gear pump 7. Consequently, there is a reduction in the velocity of piston 14.

Figure 10:
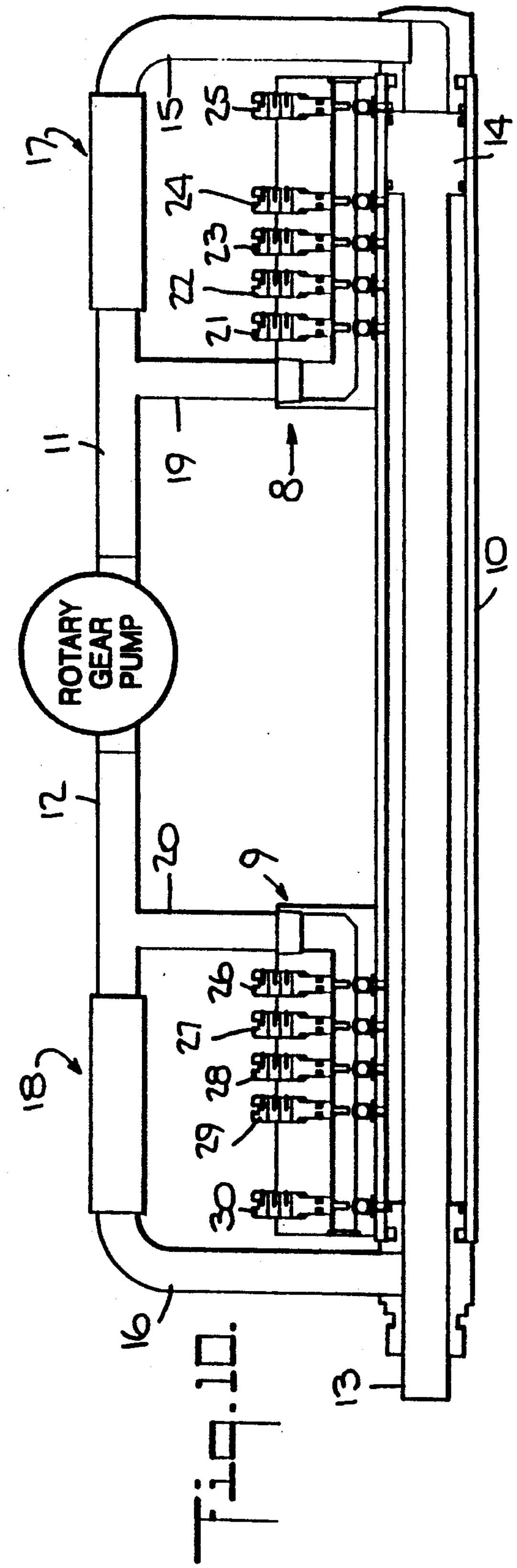
FIG. 10 is a front view of the hydraulic door opening or closing device of FIG. 3, the rod and piston in fully retracted position.

Referring now to FIG. 10, as the piston 14 passes each barrel opening to a ball check valve 22 to 24, the first manifold 8 is simultaneously converted from providing entirely directional operation to a bypassing operation. In step-wise fashion, the speed of piston 14 is continuously decreased as it passes ball check valves 21 to 24 until finally only ball check valve 25 releases fluid pressure on the driven side of piston 14 thus permitting a slow directional movement by exhausting fluid from barrel 10.

As for the closing operation, set screws of ball check valves 21 to 25 may be preset at the location of manufacture of tho present device to establish a particular deceleration of piston 14 for the door opening operation. Eventually, the piston reaches its limit actuating the door open limit switch DOL.

Referring to FIG. 2, door open limit switch DOL has normally closed contacts DOL5, DOL9 which open at this time. This contact opening deenergizes open relay O turning off the pump motor 7.

Hold open relay XO does not deenergize at this time as a hold open path is preserved through normally closed close relay contacts C2, C10. As with the door closure mode of operation, the hold open path including hold open relay XO creates a path to normally closed switch DOL such that in the event door open limit switch contacts DOL5, D019 are re-closed, the open relay O is automatically energized reopening the door. Consequently, hold open relay XO provides a safeguard against a door sagging, that is, a premature door closing caused by door closing spring action or an intentional passenger intervention.

Now, the door reversal mode of operation will be described wherein a door closing operation is automatically reversed to a door opening operation. Referring again to FIG. 2, during closing, it is necessary at times to reverse the operation because, for example, cargo or passengers have not completed their entry or exit. In this event, a door reversal command signal is transmitted to command signal terminal CS and causes a closure of reverse contacts REV. As a result, a path is closed between terminal L1 through relay winding REV to terminal L2. The energization of reverse relay REV in turn causes an opening of normally closed reverse relay contacts REV2, REV10 and a closure of normally open reverse relay contacts REV5, REV9.

The opening of reverse relay contacts REV2 and REV10 deenergizes the hold closed path to the parallel-connected close and hold closed relays C and XC respectively. With the deenergization of the close relay C, in particular, the close relay contacts C5, C9, C8, C12 return to their normally open position. As a result, the pump motor loses power and stops.

On the other hand, reverse relay contacts REV5, REV9 are closed and energize the open relay O by way of normally closed door open limit switch DOL. Consequently, the pump motor 7 is provided power via motor terminals M13, M15 and now closed open relay contacts 05, 09, 08, 012.

At the same time as reverse relay contacts REV5 and REV9 are closed, hold open relay XO is energized and closes normally open contacts XO5, XO9. In this manner, open relay O is preserved after switch contacts REV of terminal CS return to their normally open state.

The pump motor 7 continuously runs generating a pressure in line 12 to reopen the door no matter what position the piston was in during its closing cycle, that is, as shown in FIGS. 3-6, at the time the reversal command signal is received. The hold open relay XO maintains the doors in an open position until a command signal to close is transmitted to command signal terminal CS.

Referring again to FIG. 2, the operation of a protection timing circuit, comprising delay timer T1 and protection relay DPT, will be described. The purpose of the protection timing circuit is to turn off the pump motor 7 in the event that door travel is restricted by, for example, obstructions in the sliding door sill, the doors being knocked off track 4 or other obstructions.

Delay timer T1 is connected on one side to motor terminal M13 and on the other side to protection relay DPT.

As explained before, protection relay DPT comprises normally closed contacts DPT2, DPT10 which are wired in series between the line voltage applied at terminal L1 and the controlled circuit. The time constant of delay timer T1 is established at the predetermined travel time for one door cycle, either opening or closing.

In the event that the pump motor 7 runs longer than the time constant, the delay timer T1 is energized and, at the same time, protection relay DPT is energized. The energization of relay DPT in turn causes normally closed protection relay contacts DP2, DP10 to open. Consequently, the entire controller is deenergized. Power is turned off to pump motor 7 due to the deenergized open relay O or close relay C.

The controller circuit may be reactuated by turning the emergency stop switch (located within the elevator cabin) to OFF (not shown). This would automatically return protection relay contacts DPT2, DPT10 to their normally closed position. When such a emergency stop switch is returned to a RUN position, the controller circuit is already initialized and prepared to receive a door open, door close, or door reverse signal at terminal CS.

Referring more particularly to FIG. 11A, the construction and ease of maintenance of the integral cylinder and dual manifolds of the present hydraulic door opening or closing device will be discussed in greater detail.

The device shown in FIG. 11A is assembled from a barrel 10 into which is inserted a piston 14 and rod 13. Piston 14 is provided before its insertion with first and second O ring seals not particularly shown. However, annular grooves 31,32 are shown for seating the pair of O rings. An end cap 33 seals the barrel 10 at one end while, at the same time, providing an opening to fluid branch line 15. The end cap 33 is sealed inside the barrel 10 by a O-ring which is seated in annular groove 34 of the end cap. End cap 33 is also provided with an annular recessed shoulder 35 at its open end to the barrel 10. The recess of the shoulder 35 permits hydraulic fluid to flow to the final ball check valve 25 while at the same time is a stop for the full retraction of the rod 13. These O rings are the only parts susceptible to wear and, hence, replacement in the present hydraulic device.

A similar end cap, not shown, is provided at the other end of the barrel 10 but additionally comprises a third opening which is fluidly sealed about the rod 13. It also is sealed with the barrel 10, by an O ring and comprises a shoulder similar to shoulder 35.

From the second manifold 9, shown in partly cutaway view at the right of FIG. 11A, it can be seen that each manifold comprises two blocks, an upper ball check valve containing block 36 and a lower clamping block 37. These are clamped together by bolts or other fastening devices about barrel 10.

Referring more particularly to the ball valve containing block of the first manifold 8, it can be seen that branch fluid line 19 terminates in that block at pressure seal 38′ which is seated in an annular shoulder of the block.

First manifold 8 comprises five ball check valves 21–25. By way of example each ball check valve comprises a set screw and a floating ball valve portion for fluidly communicating via opening 41 with barrel 10. The set screw is fluidly sealed in a cylindrical channel of the manifold by way of a washer seated in an annular groove. A longitudinal extension of the screw limits the extent of opening or the upward movement of ball 40. Lastly, barrel opening 41 to the ball valve is sealed to the upper block of the manifold 8 by a sealing washer seated in an annular groove of the manifold.

The entire integral unit can be preassembled as described and preadjusted at the location of manufacture for a particular application. Subsequently, it can be appropriately installed to an elevator car via a holding clamp 38 or other securing device. After the motor is coupled via the supply and branch feed lines, fluid such as oil may be appropriately introduced and all the air removed from the lines in accordance with known practice.

Referring now to FIG. 11B, there is shown a cross section of the first manifold 8 along the axis A—A. From this perspective, barrel 10, upper valve containing block 36, and clamping block 37 may be seen held together by way of clamp block screws 42. Also, ball check valve 25 can be seen in detail comprising adjusting set screw 39 and ball 40 fluidly communicating with barrel opening 41. The longitudinal extension of the set screw 39 can be seen to limit the upward ascent of ball 40 and, consequently, the degree of opening of ball check valve 25.

Figure 12:
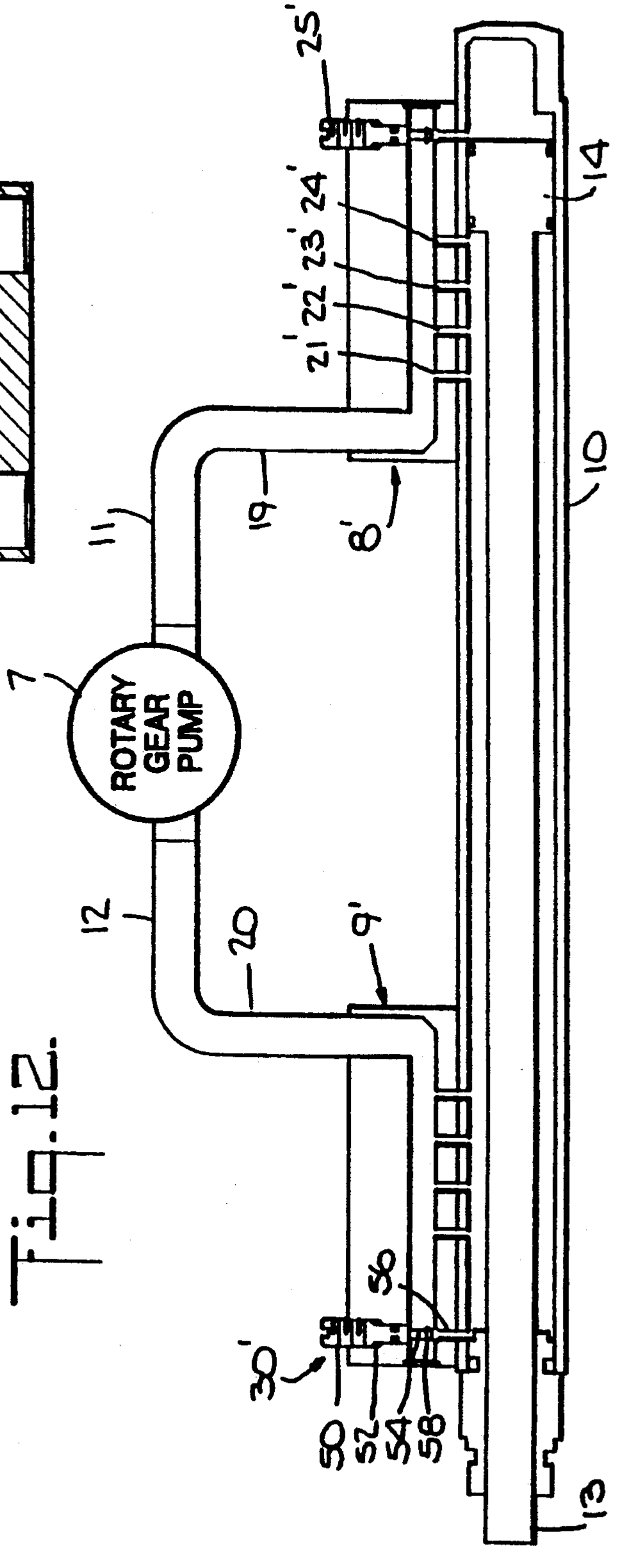
FIG. 12 is a front view of an alternate embodiment hydraulic door opening or closing device of this invention having z modified arrangement flow control/check valve.

Referring now to the alternative embodiment of FIG. 12 there is shown a rotary pump 7 fluidly coupled to first and second manifolds 8′ and 9′ via hydraulic fluid lines 11, 19, 12 and 20, respectively and barrel 10 for driving piston 14 as discussed above in connection with the other FIGS. It can be seen that while the embodiment shown in FIG. 12 includes a hydraulic cylinder having an integral manifold it differs from the embodiment described above in that the ball valves 21 to 24, and 26 to 29, and replaced with ports or openings 21′ to 24′ and 26′ to 27′, and flow valves 17 and 18 and the branch lines 15 and 16 have been eliminated. The ports 21′ to 24′ and 26′ to 29′ are shown out of scale and it will be appreciated that in practice they will be sized to bypass pressurized fluid out of barrel 10 from either the front or rear of piston 14, depending upon the direction of travel of the piston and the position in barrel 10, to slow its travel rate as described above. The ports operate in the same manner as ball valves except that they cannot be easily adjusted. In this embodiment the pressurized fluid driven by pump 7 flows via first fluid line 11 and branch line 19 to first manifold 8′ to drive piston 14 to the left (as shown). Only a small amount of piston 14 movement, e.g., 1/16 inch, is required to close port 24 and sequentially ports 23′, 22′ and 21′ accelerating the piston 14 as it moves to the left because of the increased volume of pressurized fluid driving the piston. Similarly, piston 14 is slowed to a stop by sequential opening of ports 26′ to 29′ at the opposite end of the barrel 10. When pump 7 is reversed the pressurized fluid flows in the opposite direction via a second fluid line 12 and branch line 20 to second manifold 9′ and the above-described piston 14 action is reversed. Valves 25′and 30′ perform substantially the same function as tall valves 25 and 30 and could be of the same construction.

Valve 30' is illustrative having a head 50 seated in a bore in and threadably engaged with manifold 9'. An O-ring 52 forms a fluid seal between valve 30, and manifold 9'. Stem 54 projects from head 50 into manifold 9' and has a tapered end 58 adjacent port 56. Rotation of head 50 causes tapered end 58 to move with respect to port 56 thereby variably restricting or regulating the passage of fluid through port 56.

From the foregoing it will be understood that the embodiment of FIG. 12 is a simplified design that operates in substantially the same manner as the embodiment described above in connection with FIGS. 1 to 11B.

An improved embodiment of the above-described hydraulic door actuator device and its operation are illustrated in FIGS. 13 to 21 and described below in connection with the operation of a conventional pair of 42 inch center opening elevator doors 102 and 103. In this embodiment the hydraulic circuit employed to provide movement of the doors between their open and closed positions is similar to that illustrated in FIG. 12.

Figure 13:
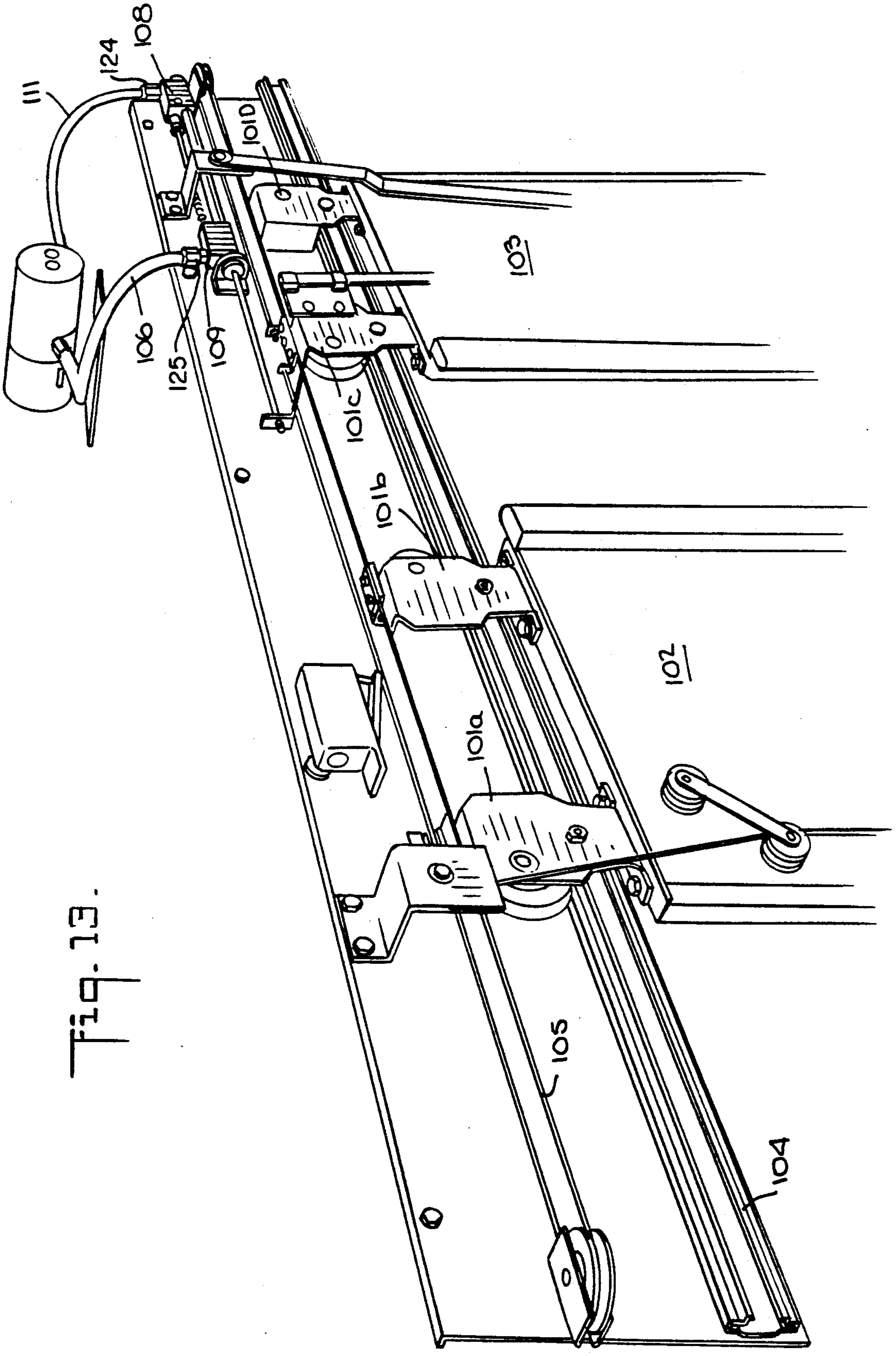
FIG. 13 is a perspective view of a hydraulic door actuator device constructed in accordance with this invention operatively connected to center opening elevator doors (between open and closed positions) an associated cable transit system and overhead door guide system.

As shown in FIG. 13 doors 102 and 103 are slidingly attached via fur roller hangers 101 (a to d) to a guide means, e.g., overhead track 104, for regulating the door travel path between their open and closed positions with respect to an elevator car (not shown). A transit cable system 105, including a pair of pulleys and a cable, operatively connects doors 102 and 103 to the hydraulic door actuator device so that they move in tandem away from each other on opening and toward each other on closing in proportional response to movement of a piston 114. Because movement of doors 102 and 103 is proportionally responsive to movement of piston 114 their speed, acceleration and deceleration in opening and closing operations can be regulated by controlling the flow of fluid that drives, piston 114 as disclosed herein.

For elevator door applications very precise regulation of door speed, acceleration and deceleration as well as opening and closing force is required to meet applicable government safety regulations. An ideal elevator door movement profile may be described as follows:

On opening a short very slow start followed by rapid acceleration to a desired maximum speed followed by a gradual deceleration and soft stop that prevents slamming against the doorjams; and On closing a slow acceleration to a desired speed followed by a slow stop that prevents the doors from slamming together. It should be noted that the closing force and speed should not exceed the maximum prescribed by applicable regulations.

Figures 14, 15:
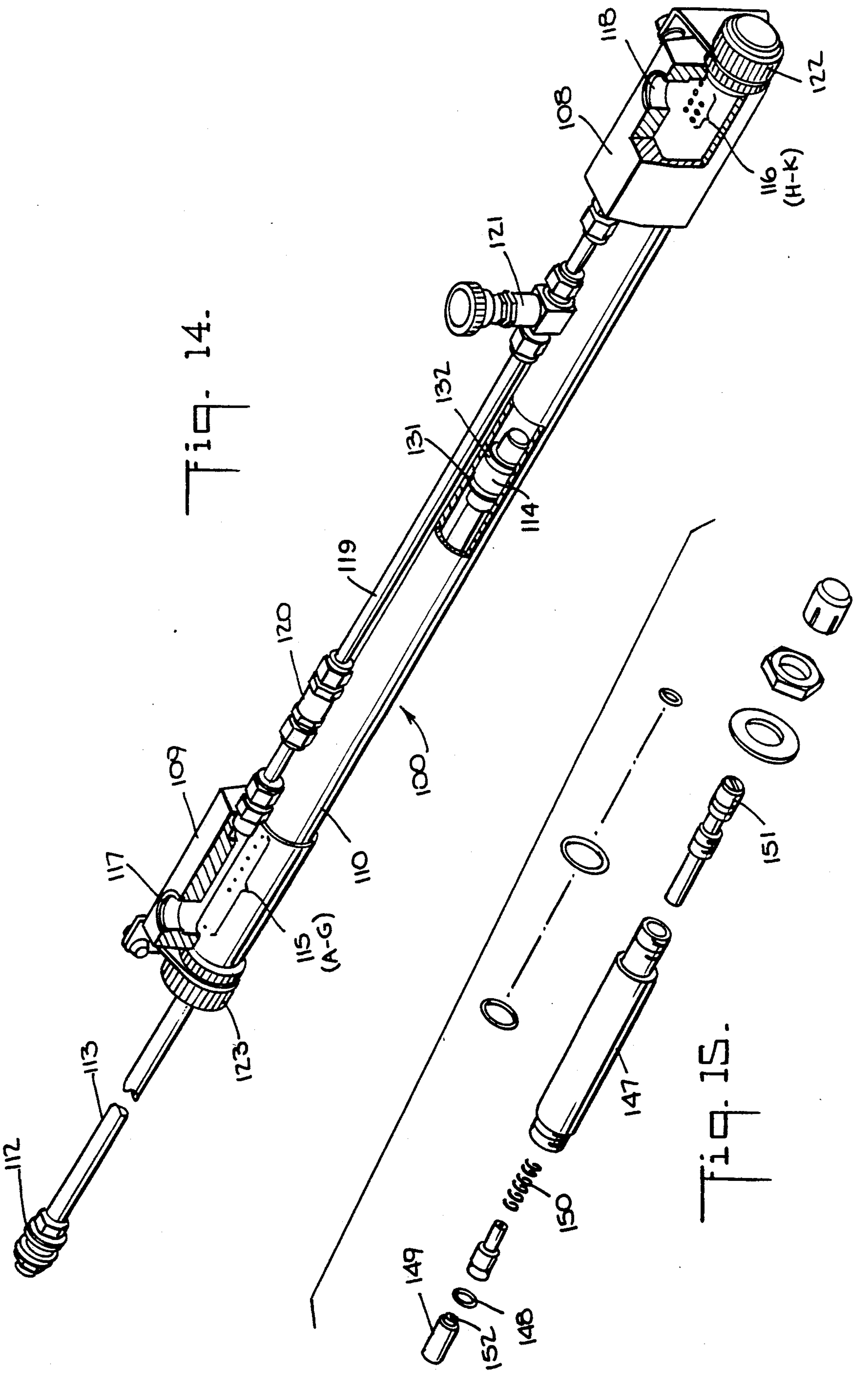
FIG. 14 is a perspective view of a cylinder unit partially cut-away to show piston 114 and fluid port configurations 115 and 116.
FIG. 15 is an exploded assembly view of relief valve of 145.
Figure 16:
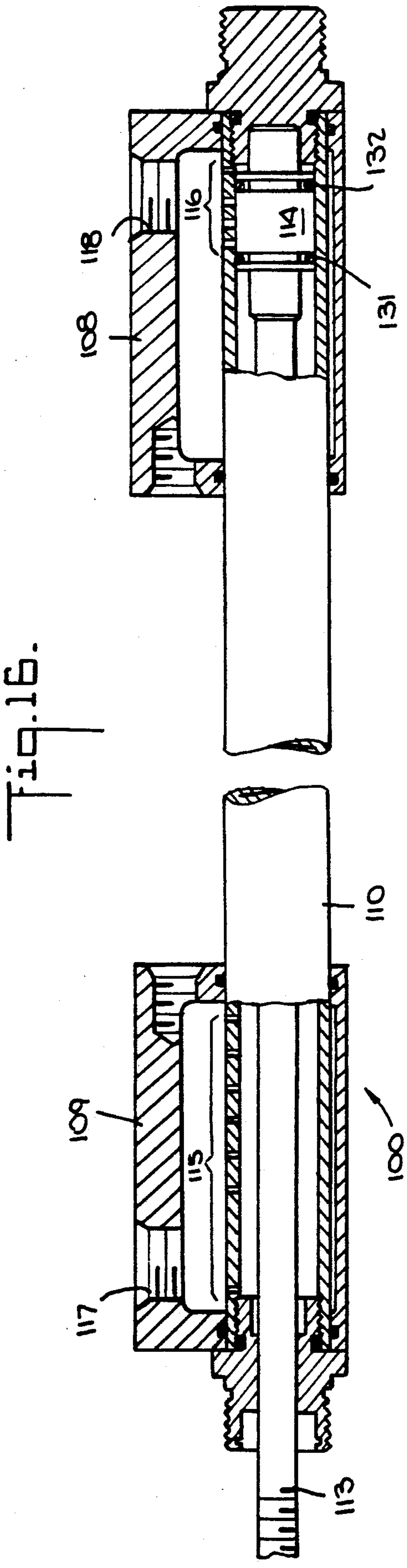
FIGS. 16 and 17 are cross-sectional views of a cylinder unit constructed in accordance with this invention with piston 114 fully retracted (door open) and fully extended (door closed), respectively.
Figure 17:
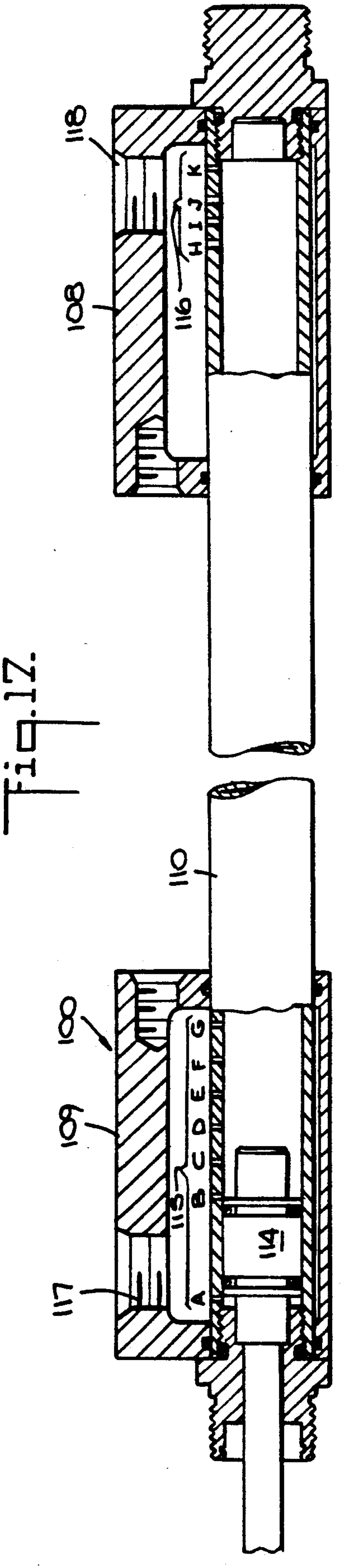

Referring now to FIGS. 14, 16 and 17 which illustrate cylinder unit 100. In FIG. 14 piston 114 is shown at one end of rod 113 disposed within cylinder 110. The opposite end of rod 113 is and provided with a connector means 112 for attachment to transit cable system 105. Manifold ends 108 and 109 are disposed at opposing ends of cylinder 110 and connected to each other by bypass tube 119 which is interrupted by check valve 120 and adjustable flow control valve 121.

Manifold 109 fluidly connects the ports 115 (A–G), pump port 117 and bypass tube 119. Manifold 108 fluidly connects ports 116 (H–K), pump port 118 and bypass tube 119. End cap 122 (cylinder head) fluidly seals one end of cylinder 110 near manifold 108 and end cap 123 fluidly seals the opposing end near manifold 109. End cap 123 is provided with an opening through which rod 113 can move while a gland (not shown) maintains a fluid seal within cylinder 110. The various component parts of cylinder unit 100 are shown in greater detail in FIGS. 16 and 17.

The cylinder 110 shown in FIGS. 14, 16 and 17 is a tube of drawn metal, such as steel, having a smooth interior surface finished to avoid excessive wear of piston seals 131 and 132. Fluid ports or holes 115 (A to G) and 116 (H to K) are drilled in opposing ends of cylinder 110. The fluid ports 115 and 116 are sized and arranged in a configuration that co-acts with piston 114 to provide a fluid flow that controls speed, accelerates, and decelerates the doors 102 and 103, as described. Piston 114 has at least two fluid seals 131 and 132 each composing an annular groove having a O-ring covered by a teflon outer ring disposed thereon. The seals are spaced on the piston so that it can close a plurality of fluid ports 115 A–G or 116 H–K simultaneously as best seen in the drawings and hereinafter described.

Piston 114 is shown disposed in cylinder 110 (FIG. 16) in a fully retracted/door open position so that all of ports H, I and J are closed while single port K is open. When pressurized fluid from pump 107 is introduced to manifold 108 via pump port 118 it flows via fluid port K into cylinder 110 urging piston 114 to the left thus slowly closing doors 102 and 103. As piston 114 moves further to the left ports J, I and H are sequentially opened rapidly accelerating doors 102 and 103 to their maximum closing speed. Table I describes the four step function of ports H to K in the closing stroke operation.

TABLE I

| Steps | Fluid Ports 116 H | I | J | K |
|---|---|---|---|---|
| Distance* (inch/1000) | 1.248 | 1.048 | 0.848 | 0.555 |
| Diameter | 0.073 | 0.073 | 0.073 | 0.038 |
| 1 | C | C | C | OP |
| 2 | C | C | OP | OP |
| 3 | C | OP | OP | OP |
| 4 | OP | OP | OP | OP |

OP = open to pressure
C = closed
*Distance = space between the end of the cylinder and port centers.

to maximum closing speed. As the piston 114 moves further to the left doors 102 and 103 near the fully closed position (see: FIG. 17) ports 115 A to G begin to function and gradually decelerate the doors to a stop. Table II describes the nine step function of ports 115 A–G on the closing stroke.

TABLE II

| Steps | Fluid Ports 115 A | B | C | D | E | F | G |
|---|---|---|---|---|---|---|---|
| Distance (inch/1000 | 0.550 | 1.520 | 1.840 | 2.160 | 2.480 | 2.800 | 3.120 |
| Diameter | 0.028 | 0.028 | 0.028 | 0.028 | 0.028 | 0.035 | 0.035 |
| 1 | OE | OE | OE | OE | OE | OE | OE |
| 2 | OE | OE | OE | OE | OE | OE | C |
| 3 | OE | OE | OE | OE | OE | C | C |
| 4 | OE | OE | OE | OE | C | C | OB |
| 5 | OE | OE | OE | C | C | OB | OB |
| 6 | OE | OE | C | C | OB | OB | OB |
| 7 | OE | C | C | OB | OB | OB | OB |
| 8 | OE | C | OB | OB | OB | OB | OB |
| 9 | OE | OB | OB | OB | OB | OB | OB |

C = close
OE = open exhaus
OB = open bypass

It can be seen from TABLE II that the doors 102 and 103 will gradually come to a stop in a stepped sequential fashion as fluid ports 115 B to G gradually bypass or divert pressurized drive fluid to pump port 117 which in this mode of operation is returning fluid to pump 107. Some deceleration or damping is also provided by the restricted exhaust of fluid via port 115 A. It should be noted that fluid ports K and A are always opened regardless of the position of piston 114.

When piston 114 is urged by fluid pressure from pump 107 in the reverse direction , i.e., the open stroke fluid ports 115 A to G and 116 H to K control fluid flow in a different sequence. As pressurized fluid is introduced to manifold 109 via pump port 117, manifold 108 and pump port 118 function as a return to pump 107. Starting from the position shown in FIG. 17 piston 114 moves further to the right it begins to sequentially close ports 115 B to G to pressure bypass and open them to the drive side of the piston 114. Table III describes the 9 step function of ports 115 A–G on the open stroke.

TABLE III

| | Fluid Ports 115 | | | | | | |
|---|---|---|---|---|---|---|---|
| Steps | A | B | C | D | E | F | G |
| 1 | OP | OB | OB | OB | OB | OB | OB |
| 2 | OP | C | OB | OB | OB | OB | OB |
| 3 | OP | C | C | OB | OB | OB | OB |
| 4 | OP | C | C | C | OB | OB | OB |
| 5 | OP | OP | C | C | C | OB | OB |
| 6 | OP | OP | OP | C | C | C | OB |
| 7 | OP | OP | OP | C | C | C | OB |
| 8 | OP | OP | OP | OP | OP | C | C |
| 9 | OP | OP | OP | OP | OP | OP | C |
| 10 | OP | OP | OP | OP | OP | OP | OP |

It can be seen from TABLE III that on the open stroke the piston 114 moves slowly through a dwell region between ports 115A and B driven by pressurized fluid from fluid port 115A and thereafter gradually accelerated (steps 5 to 10) to maximum opening speed. As piston 114 moves further to the right and doors 102 and 103 approach the fully open position. Preferably, about 2½ to 3 inches before the piston 114 intersects fluid port 116 H, the pump is automatically turned off and inertia driver the doors 102 and 103 to the fully open position. Table IV describes the 4 step function of fluid ports 116 H to K on the open stroke.

TABLE IV

| | Fluid Ports 116 | | | |
|---|---|---|---|---|
| Steps | H | I | J | K |
| 1 | OE | OE | OE | OE |
| 2 | C | OE | OE | OE |
| 3 | C | C | OE | OE |
| 4 | C | C | C | OE |

It can be seen from Table IV that at the end of the open stroke the out flow of fluid from cylinder 100 is sequentially restricted to the capacity of port 116 K only while as noted above the driving fluid from pump 107 cut off. Thus the doors 102 and 103 are rapidly brought to a stop without slamming against the doorjams.

Pump 107 is connected to manifold 109 via hose 106 and manifold 108 via hose 111 so that drive fluid can be delivered to or returned from pump 107 in either hose. Fittings 124 and 125 fluidly connect hoses 111 and 106 to ports 118 and 117, respectively.

Figure 18:
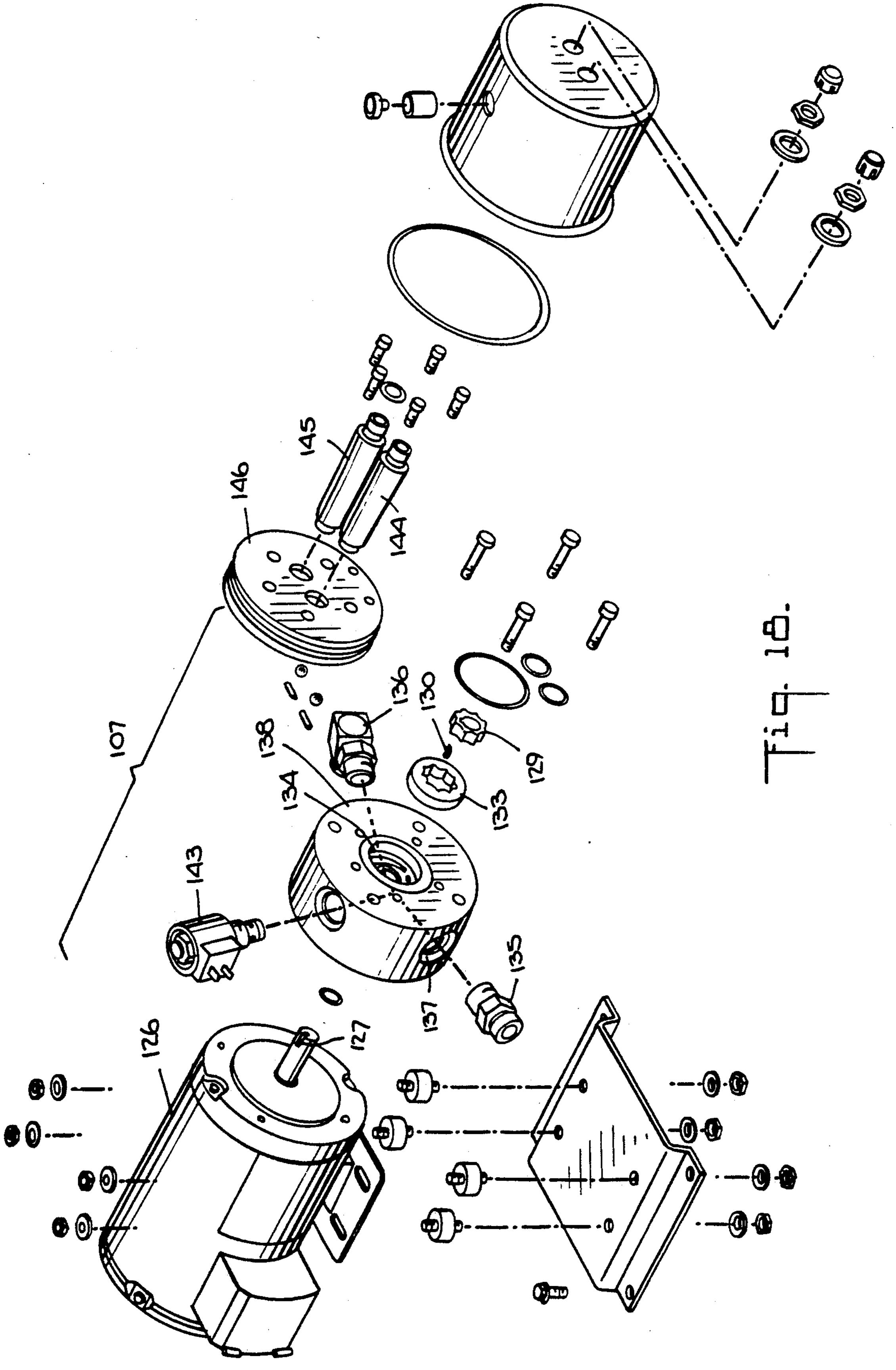
FIG. 18 is an exploded assembly view of a constant-delivery pump and associated relief valves, solenoid nudging valve and electric motor.
Figure 20:
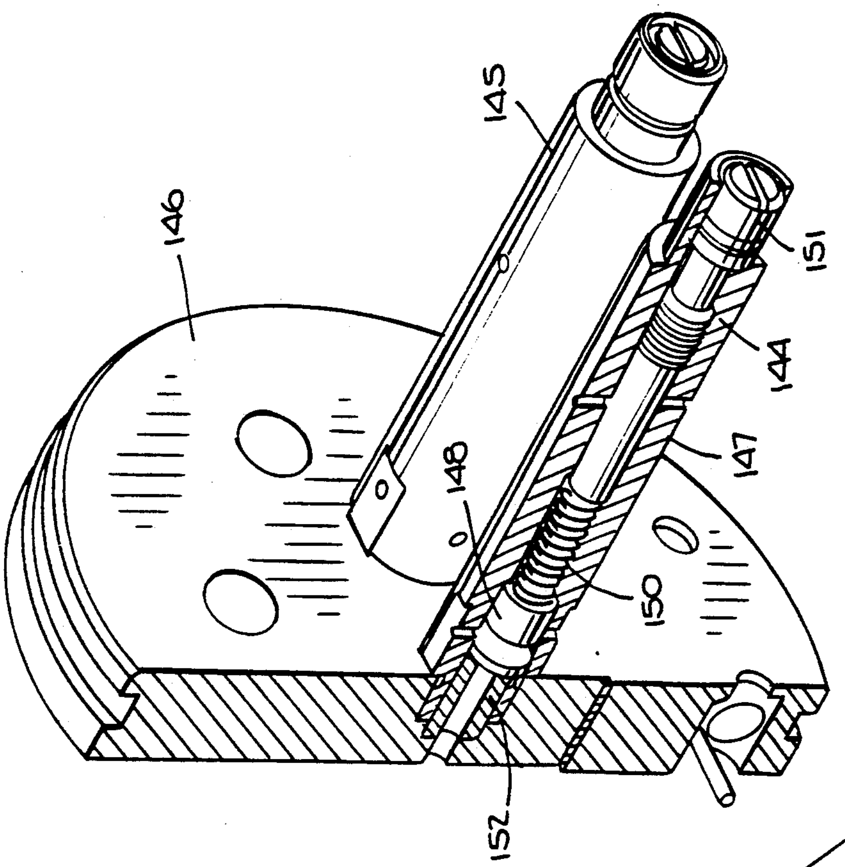
FIG. 19 and 20 are enlarged views of the constant-delivery pump, solenoid nudging valve and relief valves shown in FIG. 18.
Figure 19:
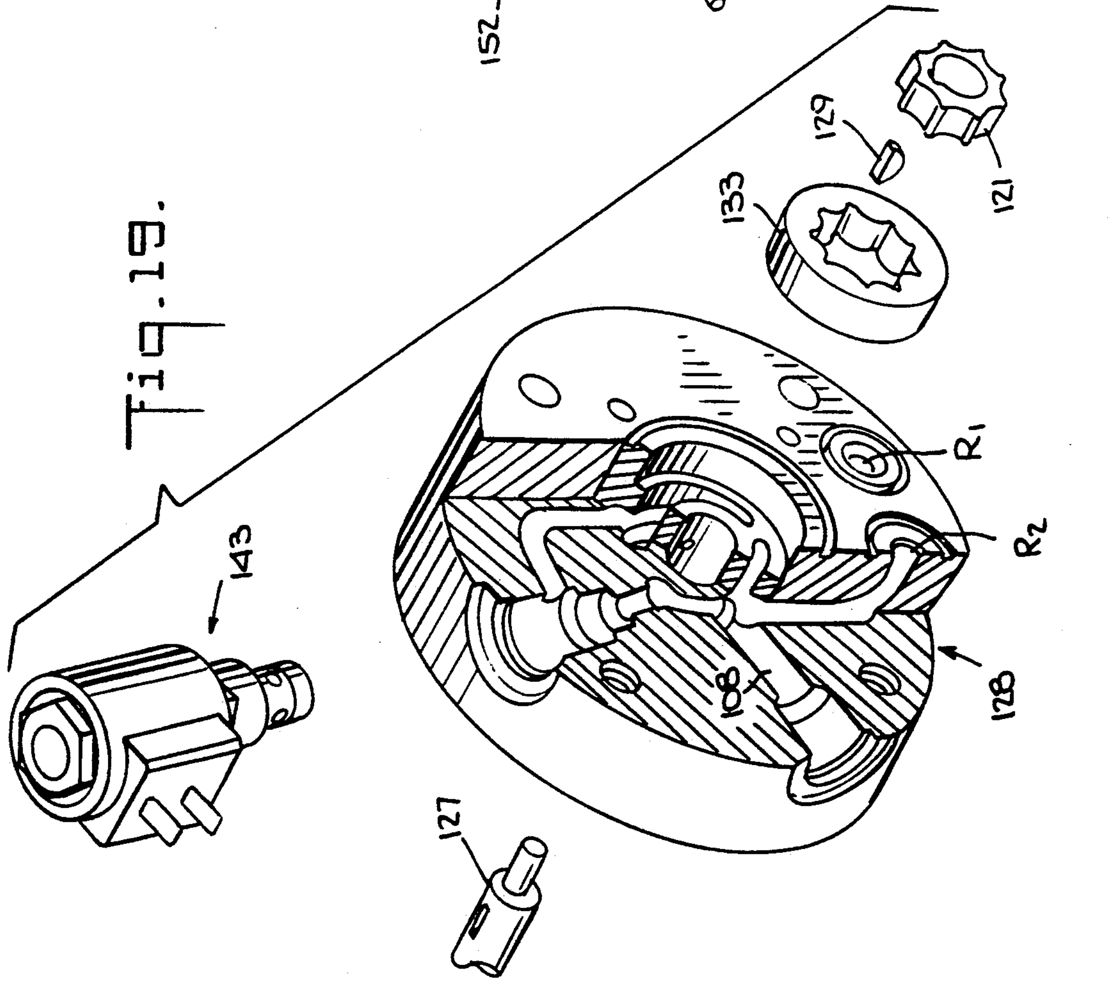

Pump 107 is best seen in FIG. 18. Shaft 127 extends from motor 126 through pump housing 128 and is fixedly attached gerotor drive gear 129 with key 130. Drive gear 129 engages planetary gear 133 eccentrically within pumping chamber 134 so that when shaft 127 rotates in either direction (clockwise or counterclockwise) planetary gear 133 undergoes a reciprocating movement which displaces fluid within chamber 134. The displaced fluid is thus pumped to cylinder unit 100 via hose 106 (pressure) and returned via hose 111 (exhaust) when motor 107 rotates in one direction. When motor 107 is reversed hose 111 pumps or delivers fluid (pressure) to cylnider unit 100 and hose 106 returns fluid (exhaust) to pump 107. Fittings 135 and 136 fluidly connect hoses 106 and 111 to pump housing 128, respectively. Pump housing face plate 146 encloses pump chamber 134. Passages 137 and 138 in pump housing 128 provide fluid communication between hoses 106 and 111 respectively and the pumping chamber 134. Thus fluid displaced from pumping chamber 134, when shaft 127 is rotated clockwise, is pumped via passage 137 through hose 106 to cylinder unit 100's manifold 109 to drive piston 111 in the door opening stroke. Relief valve 144 is in fluid communication with passage 137 so that the pressure of fluid pumped to the cylinder unit 100 through hose 106 can be adjusted preferably to about 300 psi. When shaft 127 is rotated counter-clockwise fluid is displaced from pumping chamber 134 to via passage 138 through hose 111 to cylinder unit 100's manifold 108 to drive piston 114 in the door closing stroke. Relief valve 145 is in fluid communication with passage 138 so that the pressure of fluid pumped to the cylinder unit 100 through hose 111 can be adjusted preferably to about 70 psi.

Each of relief valves 144 and 145 are of the same construction best seen in FIG. 15. Each relief valve comprises a body 147 having a valve seal 148 urged into contact with a valve seat 149 by a spring 150. The urging force of spring 150 can be adjusted by turning screw 151 clockwise to increase the pressure at which seal 148 becomes unseated by pressure in fluid passage 137 or 138 and counter-clockwise to reduce that pressure. When seal 148 becomes unseated pressurized fluid from passage 137 or 138 is bypassed to a reservoir in pump 107 so that output fluid pressure can be regulated to optimum levels.

Solenoid valve 143 (FIG. 18) is in fluid communication with passage 138 so that when opened the pressure of fluid to manifold 108 in the close stroke is further reduced. The solenoid valve 143 can be opened by a photodetector (not shown) which indicates an obstruction in the path of doors 102 and/or 103 on the close stroke. When solenoid valve 143 is open the pressure should be low enough to permit the doors 102 or 103 to continue to close at a reduced force to nudge persons or objects from the door entrance, not exceed about 2.5 joules.

The hydraulic door actuator shown in and described in FIGS. 13 to 21 has the following dimensions:

TABLE V

| | | |
|---|---|---|
| Pump | | |
| Reservoir Capacity | 1 | U.S. quart |
| Pump Output | 1.425 | gal/min. |
| Pump Output | 5.486 | $in^3$/sec. |
| Cylinder | | |
| Out Stroke Volume | 9.60 | $in^3$ |
| In Stroke Volume | 7.20 | $in^3$ |
| Out Stroke Office Area | 0.00438 | $in^2$/ |
| In Stroke Office Area | 0.0388 | $in^2$/ |
| Total Stroke Length | 21.75 | in. |

TABLE V-continued

| | |
|---|---|
| Cylinder Bore | 0.750 in. |

An additional fluid bypass device comprising tube 119, check valve 120 and adjustable valve 121 is provided for regulating the flow of pressurized fluid from pump 107 to manifold 108 on the close stroke only (to the left in FIG. 14.). The tube 119 check valve 120 and valve 121 bypass pressurized fluid from manifold 108 to manifold 109. Adjusting valve 121 permits regulation of the volume of fluid driving the piston 114 on the close stroke so that the speed and closing force of doors 102 and 103 can be precisely adjusted as desired, e.g., to meet code regulations. The check valve 120 completely disables this bypass device during the open stroke (to the right in FIG. 14) in order to achieve maximum opening speed. For example, if pump 107 has a flow rate of 1.4 to 1.5 qpm relief valves 145 is set at 70 psi closing pressure and relief valve 144 is set at 300 psi opening pressure; the opening and closing time of car doors 102 and 103 and associated hoistway doors (having a total combined weight of about 350–400 lbs) can be precisely adjusted to an opening time of about 1.2 to 1.6 seconds and closing time of about 2.3 to 3.0 seconds.

Figure 21:
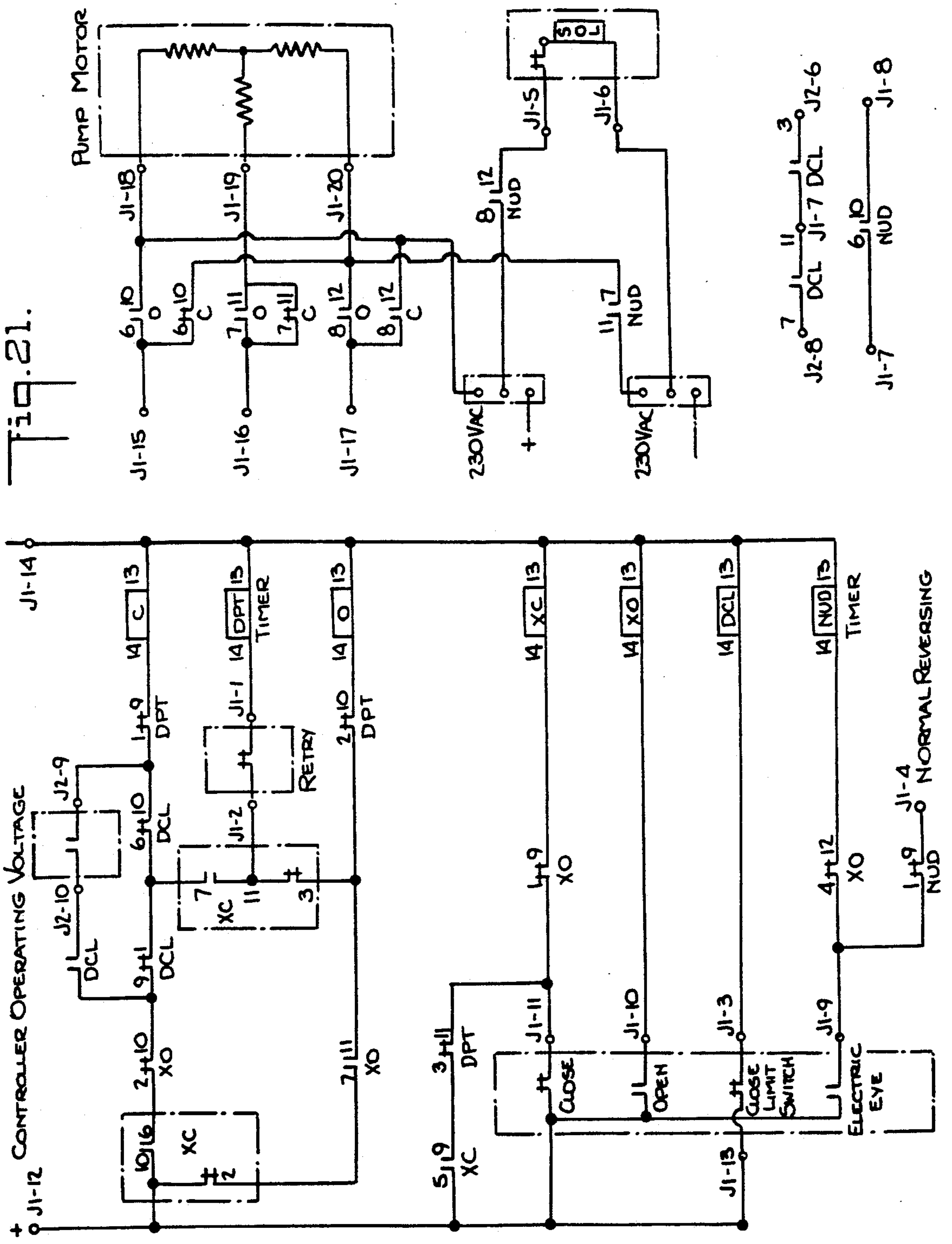
FIG. 21 is an schematic diagram of an the electrical circuit for controlling the operation of the hydraulic door actuator device of this invention.

The electrical circuit for regulating the function of the above-described hydraulic door actuator device is shown in FIG. 21. Preferably the control is a relay-based printed circuit board which provides proper operations to the hydraulic door-operating mechanism and which complies with the ASME/ANSI A17.1-1987 Safety Code for Elevators and Escalators.

The Door Controller (VDC) will accept input signals from a conventional main elevator controller (not shown) and also accept status signals from the elevator car. The main elevator controller is responsible for providing 'DRY CONTACT', input signals to instruct the control circuit to perform a CLOSE or OPEN operation. Status signals from the elevator car include, for example, an electric eye (EE), a door close, a door open status switches and a thermostat indicator.

The thermostat indicator is used when the hydraulic system requires an internal warming cycle due to large ambient temperature variations. The thermostat switch, is mounted in the motor 107, to ensure that the hydraulic system temperature is within a range of about 70 to about 100 degrees Farenheit. When DCL and the thermostat closes on temperature drop "C" is energized. The wiring configuration of the C relay enables the motor 107 to turn in the direction that closes the door(s) so that fluid being circulated through the cylinder unit 100 is frictionally heated. This cycle will continue until the thermostat reaches a preset temperature thus opening the circuit to the "C" relay.

When O is energized, the wiring configuration of the O relay enables the motor 107 to turn in the direction to open the doors 102 and 103. DCL represents the DOOR CLOSE STATUS of the elevator car doors which is used to stop the door closing motion of the motor 107. DCL is, also, used in the warming cycle of the hydraulic system described above. Alternate open relay (XO) is energized by an OPEN signal initiated from the main elevator controller. (XC) is a self-holding relay which is energized by the CLOSE signal initiated from the main elevator controller. XC will remain energized until the reception of the OPEN signal. If OPEN signal and CLOSE signal are on at the same time, XO will take OPEN as the override signal.

Door Protect Time Relay (DPT) is a field-adjustable delay-on timer. The purpose of DPT is to time out either the OPEN or CLOSE command if the doors have not traveled from the fully-closed position to the fully-opened position, or from the fully-opened position to fully-closed position, within a specified amount of time. When the operation is timed out, the DPT will disconnect the motor 107. Normally the DPT is set to time out at about 5 times the door closing time.

Nudging Time Relay (NUD) is a field-adjustable delay-on timer. NUD, when energized, will turn on the nudging solenoid 143 mounted on the pump housing 128 as described above. When activated this solenoid 143 will bypass the hydraulic fluid causing the door to close at a slower than the normal speed as described above. Typically the NUD speed is about 1.68 times the normal code time for the door style and size of the opening.

The CLOSE Signal, generated from the main elevator controller, instructs the control circuit to close the elevator car doors 102 and 103. This close operation is detailed by the following sub-functions (A. to D.)

A. The CLOSE signal energizes the XC relay. XC contacts 10 and 6 (XC 10/6) will, in turn, energize the C relay causing the motor 107 to be turned on and rotate in the CLOSE direction.

B. The C relay will be ON until Door Close Limit Switch (DCL) detects a fully-close door position status (Relay DCL 9/1 will de-energize C relay). If a CLOSE operation is initiated via--thermostat switch and DCL is on (Door is already in fully closed position), the CLOSE cycle will start the warming cycle as mentioned above.

C. Because XC is self-holding (XC 5/9), XC will stay ON even after CLOSE signal is removed. If the DCL detects a 'door not fully closed' (DCL 9/1 and DCL 6/10), XO 3/10 and DPT 3/9 will automatically start another CLOSE cycle. This action is primarily to prevent passengers from pulling the car door open while the elevator is in flight. (Between floor landings)

D. XC 7/11 will, also, turn on the DPT delay on time relay if the CLOSE cycle has not been properly executed—DCL will be ON and DPT 9/1 will de-energize the C relay. If DCL is not ON within a time specified, DPT will energize (delay-on timer), and DPT 1/9 will de-energize the C relay (disconnecting motor 107 and DPT 3/11 de-energizes the self-holding XC.

The OPEN signal, generated from the main elevator controller, instructs the control circuit to open the elevator car door. The operation is detailed by the following sub-functions. (A. to C.)

A. The OPEN signal de-energizes the XC thru the XO 1/9 relay, and energizes the XO relay. XO 7/11, and XC 10/2 then, energize the O 14/13 (OPEN) relay.

B. XO 7/11 and 10/6 will, also, begin the delay on time sequence of the DPT time relay through XC 11/3. When the OPEN cycle is properly executed—the door will be opened—, the OPEN signal will be removed by the main elevator controller, which will de-energize the XO. XO 7/11 will de-energize the DPT timer. This will complete the OPEN cycle.

C. If O is energized longer than the time specified, DPT will energize (delay-on time), and DPT 2/10 will de-energize the O relay (disconnecting motor 107).

The EE (Electric Eye) contacts will be closed when an object is in the elevator door path (J1-9). This will cause the control circuit to send a request for normal reverse (OPEN), NUD 1/9, to the main elevator controller (J1-4). The EE will also start the NUD timer. If the NUD energizes (delay-on timer), NUD 8/12 and NUD 7/11 will activate the solenoid valve 143, NUD 1/9 removes the normal reverse. At this time the EE J1-9 hold open command is over-ridden. The solonoid is activated and the door closes at a reduced speed due to the solonoid. If the object is cleared away from the elevator door path, EE input contacts will drop, which, in turn, de-activates solenoid valve 143. 'NUD Normally-Open (NO)' contacts are placed on the control circuit external connector, J1-7 and J1-8, for optional buzzer circuit.

The control circuit picks up signals from the Door Close Limit Switch, which is mounted on the car and sends out signals in the form of DCL relay contacts. These contacts are functionally equivalent to the DCL Switch terminals.

TABLE VI

| FUNCTION | RELAY DCL CONTACT | CONNECTOR PIN NUMBER |
|---|---|---|
| COM | 11 | J1-7 |
| NO | 7 | J1-8 |
| NC | 3 | J1-6 |

An optional retry on door protection is a 'DRY-CONTACT NORMALLY-CLOSE' input signal (J1-1 to J1-2). When the DPT energizes, both the C and O are deenergized. This causes the motor 107 to stop. A RETRY signal, if used, will re-cycle the control circuit.

To enable the RETRY option, a jumper from J1-1 to J1-2 must be removed. The retry logic must be generated by the main elevator controller, and inputted back the J1-1 and J1-2 terminals.

Figure 24:
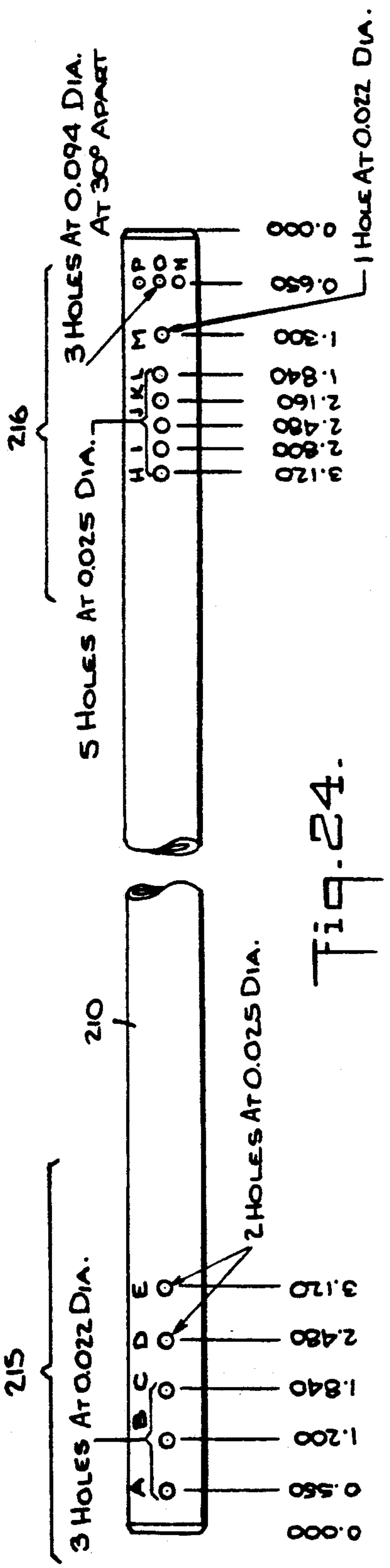
FIG. 24 is a top plan view of the cylinder illustrating the end ports and control port configuration for the embodiment of FIGS. 22 to 26.
Figure 25:
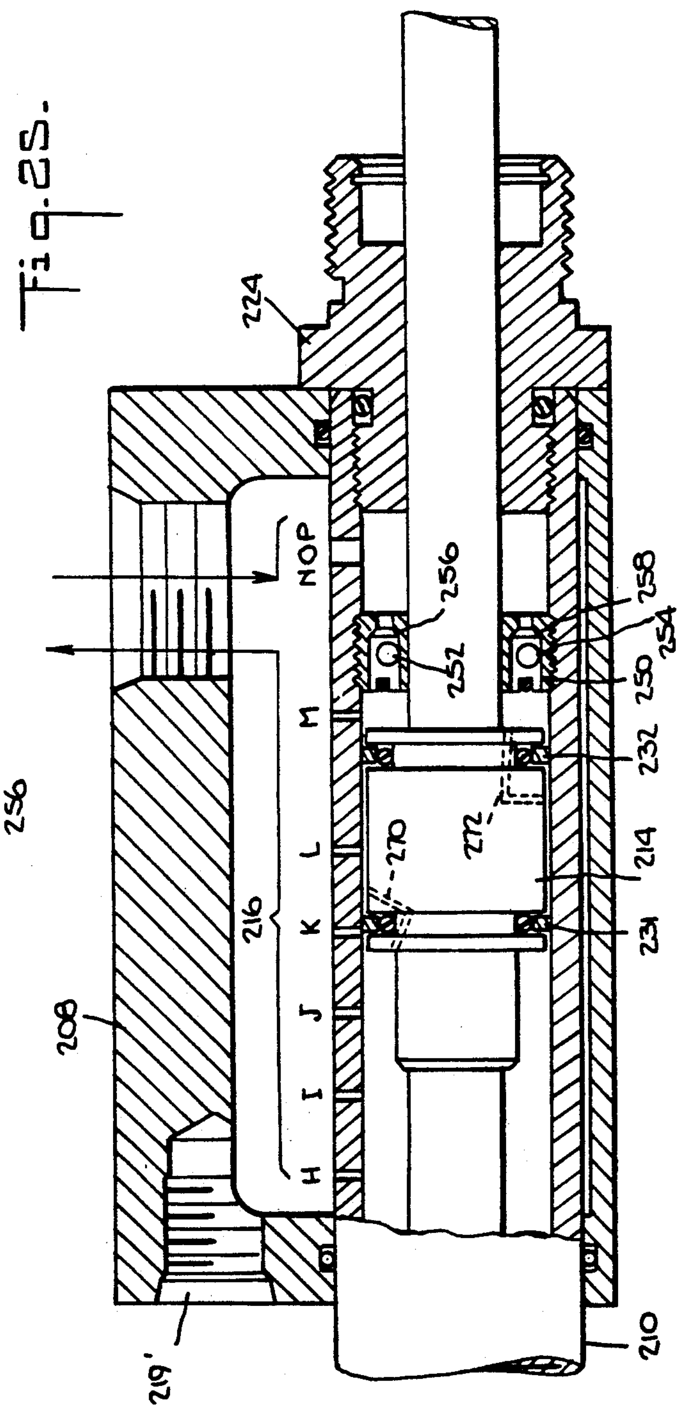
FIG. 25 is an exploded cross-sectional view of the manifold 208 shown in FIGS. 22 and 23.
Figure 26:
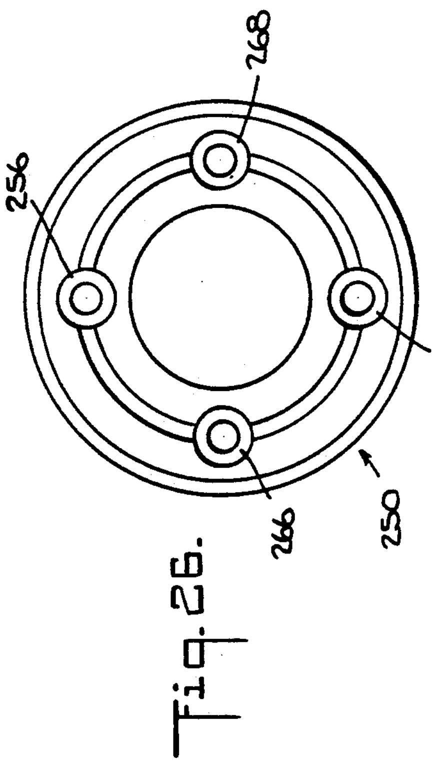
FIG. 26 is a top plan view of the radial check valve 250.

Yet another embodiment of the hydraulic door actuator device and its operation are illustrated in FIGS. 24 to 26 and described below in connection with the operation of a single elevator door (not shown) which open (slides) in one direction. In this embodiment the hydraulic circuit employed to provide movement to the door 202 similar to that illustrated in FIG. 12. The door 202 is slidingly attached to an overhead track and transit cable system including pulleys and a cable substantially in a manner illustrated in FIG. 13 in connection with the double opening door embodiment described above. The ideal movement profile for a single elevator door is similar to that described above for one of doors 102 or 103 in the double opening door embodiment.

Figure 22:
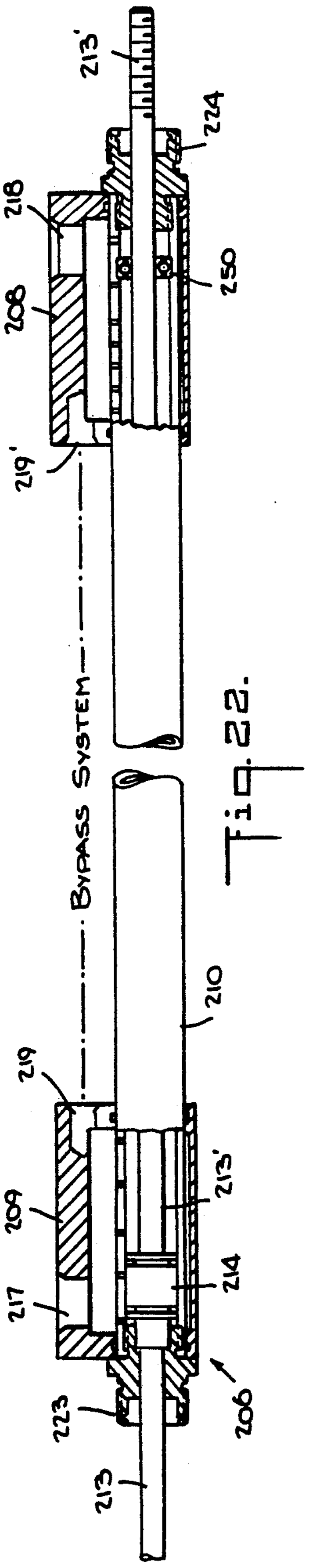

Referring now to FIGS. 22 to 26. In FIG. 22, piston 214 is shown and disposed in cylinder 210 having rods 213 and 213' extending from opposing ends thereof and end caps (cylinder heads) 223 and 224, respectively. Manifold ends 208 and 209 are disposed at opposing ends of cylinder 210 and connected with a bypass system comprising a tube, check valve and adjustable flow control valve, similar to that described above in connection with the double door embodiment (tube 119, check valve 120 and adjustable flow valve 121). Manifold 208 fluidly connects ports 215 (A to E), pump port 217 and bypass tube port 219. Manifold 208 fluidly connects ports 116 (H to P), pump port 218 and bypass tube port 219'. End caps 222 and 223 fluidly seal the ends of cylinder 210 and rods 213 and 213', respectively. The fluid ports 215 (A to E) and 216 (H to P) regulate the flow of fluid through manifolds 208 and 209 to control the speed of door 202 (not shown) in a manner similar to fluid ports 115 and 116 described above. However, as seen in the FIGS. 22 and 23, fluid ports 215 and 216 are arranged and configured in a somewhat different fashion so that they provide the ideal movement profile for the single door embodiment.

Piston 214 includes two fluid seals 231 and 232 each composing an annular grove having an O-ring covered by a teflon outer ring disposed therein. Seals 231 and 232 are spaced on the piston sot hat a plurality of the fluid ports 215 (A to E) and 216 (H to P) can be simultaneously closed by piston 214 as seen in the drawings.

Figure 23:
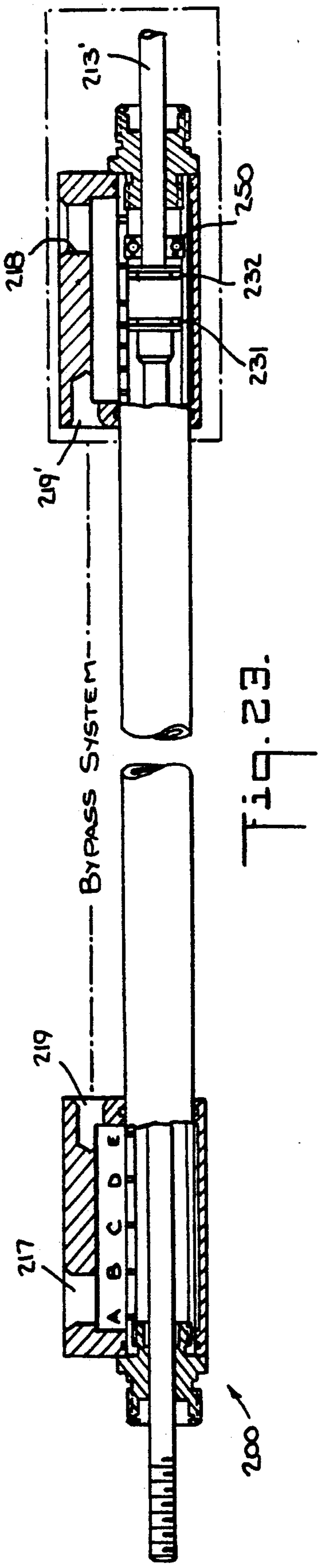
FIGS. 22 and 23 are cross-sectional views of a cylinder unit constructed in accordance with this invention showing the piston fully extended (door closed) and fully extended (door open), respectively.

In FIG. 22 piston 214 is shown at the extreme left of cylinder 210 which for purposes of illustration will be referred to as the fully closed door position. FIG. 23 illustrates the piston at the extreme right of cylinder 210 which will be referred to for purposes of illustration as the fully opened door position.

It has been found that to achieve proper door movement, in particular, not exceeding the allowable "code" closing force of 30 lbs. thrust on doors during the closing stroke ports 216 (N–P) should be valved. Table VI below provides illustrative port diameters for each of ports 215 and 216 and the distance of each port from the end of the cylinder 210. It should be understood that end caps 223 and 224 extend into the cylinder at each end reducing the effective distance by about one-half inch.

FIG. 25 illustrates the details of manifold 208 and radial check valve 250 for the ports 216 (N–P). Valve 250 is threaded into cylinder 210 so that it is fixed between ports M and ports (N–P). At the end of the door opening stroke piston 214 passes ports 216 sequentially closing and opening ports 216 H, I, J, K, L and M while fluid pressure pushes balls 252 and 254 into seats 256 and 258 so that little or no fluid is exhausted via ports 216 (N–O) P at this time.

In contrast, at the beginning of the closing stroke pressurized fluid flows via ports 216 (N–P) into radial check valve 250 pushing balls 252 and 254 away from valve seats 256 and 258 sot hat the fluid freely flows into the cylinder piston 214 away from end cap 224.

Radial check valve 250 is illustrated in FIG. 26 which shows valve seats 262 and 264 not seen in FIG. 25.

TABLE VII

| | PORTS 215 | | | | |
|---|---|---|---|---|---|
| | A | B | C | D | E |
| Distance* | .055 | 1.200 | 1.840 | 2.480 | 3.120 |
| Diameter | 0.022 | 0.022 | 0.022 | 0.025 | 0.025 |

| | PORTS 216 | | | | | | |
|---|---|---|---|---|---|---|---|
| Distance* | 0.065 | 1.300 | 1.840 | 2.160 | 2.480 | 2.800 | 3.120 |
| Diameter passage 272 | 0.025 | 0.025 | 0.025 | 0.025 | 0.025 | 0.022 | 0.094 |

*Distance from the end of cylinder.

In some applications it may be desirable to provide one or more passages, e.g., passage 270 and passage 272 (shown in FIG. 25 only). These passages 270 and 272 reduce the pressure differential in the space between the piston seals 231 and 232 providing smoother more quiet operation.

What is claimed is:

1. A pressurized fluid operating device for opening and closing a door comprising:

an elongated cylinder, a piston of predetermined length slidingly disposed within the cylinder and an elongated piston rod extending from one end of the piston, a pair of cylinder heads each sealing a different opposite end portion of the cylinder, one of the cylinder heads having an opening therein for forming a sealable and slideable fit with the piston rod extending therethrough, the piston having a rest position adjacent each of the different opposite end portions of the cylinder and each rest position corresponding to a different one of the fully opened and fully closed conditions of the door, a pair of end ports each in communication with the interior of the cylinder adjacent a different opposite end portion thereof, each of the end ports being adapted to be connected alternately to a passage providing a source of fluid pressure to drive the piston along the length of the cylinder, the improvement comprising the cylinder having first and second sets of a pluralty of control ports in communication with the interior of the cylinder, each of the sets of control ports extending for a predetermined distance along the length of the cylinder from adjacent a different opposite end portion of the cylinder toward a central portion thereof, the control ports in each set being spaced from one another along the length of the cylinder, the access of flow with respect to the control ports at one end of the cylinder being different from the access of flow with respect to the control ports at the opposite end of the cylinder, the interval in the direction of the length of the cylinder between at least some of the adjacent control ports in the first set of a plurality of control ports is different than the interval along the length of the cylinder between at least some of the adjacent control ports in the second set of a plurality of control ports to enable the access of flow with respect to the control ports of the first and second sets to be different in response to the position of the piston adjacent thereto, and means for alternately connecting one of the passages and one set of control ports adjacent thereto to a source of higher fluid pressure for operating the door while connecting the other of the passages and control ports adjacent thereto at the opposite end of the cylinder to an exhaust fluid pressure, the different intervals and accesses of flow with respect to the control ports giving different operating conditions for the opening and the closing of the door.

2. A pressurized fluid operating device according to claim 1 in which the ports in the first set of control ports adjacent one end portion of the cylinder are spaced with respect to one another along the length of the cylinder and have openings of predetermined sizes to provide that access of the high fluid pressure to the cylinder is regulated by the piston sequentially closing and opening the ports to accelerate the piston in a sequential fashion for a door closing stroke.

3. A pressurized fluid operating device according to claim 2 in which the ports in the second set of control ports adjacent the other end portion of the cylinder are spaced with respect to one another along the cylinder and having openings of predetermined sizes to provide that access of the high fluid pressure to the cylinder is regulated by the pistons sequentially closing and opening the ports to cause the high pressure fluid in a stepped sequential fashion to accelerate the piston for a door opening stroke.

4. A pressurized fluid operating device according to claims 2 or 3 in which at least one of the first and second sets of control ports is adapted to progressively decelerate the piston by bypassing high fluid pressure from the cylinder and by restricting exhaust from the cylinder to a low fluid pressure in response to the piston sequentially closing and opening the control ports of a set thereof.

5. A pressurized fluid operating device according to claims 2 or 3 in which one of the set of control ports is adapted to progressively decelerate the piston only by restricting exhaust from the cylinder to a low fluid pressure.

6. A pressurized fluid operating device in accordance with claim 2 in which at least a portion of the ports in the first set of control ports are closed by the piston when the piston is in a rest position adjacent to the first set of control ports, the piston when commencing a door closing stroke in response to pressurized fluid pressure delivered to the cylinder by the end port adjacent to the first set of control ports being adapted to sequentially open the control ports of the first set of control ports commencing with the control port thereof adjacent the end portion of the cylinder and continuing with each control port in the direction of the central portion of the cylinder, the sequential opening of the control ports enabling pressurized fluid to enter the interior of the cylinder between the end portion of the cylinder and the piston to accelerate the piston for a door closing stroke with sequential increases in acceleration corresponding to the opening of the control ports by the piston, the control ports of the first set of control ports being sequentially closed by the piston as the piston is driven by pressurized fluid from the second set of control ports for a door opening stroke, the sequential closing of the control ports of the first set of control ports reducing the access of flow through the control ports to an exhaust fluid pressure and increasing the back pressure applied to the piston opposite to the direction of motion thereof for a door opening stroke.

7. A pressurized fluid operating device in accordance with claim 6 in which the first set of control ports comprises a plurality of control ports spaced along the length of the cylinder with a predetermined interval therebetween.

8. A pressurized fluid operating device in accordance with claim 7 in which the plurality of control ports comprises at least three control ports.

9. A pressurized fluid operating device in accordance with claim 6 in which the second set of control ports is open to flow of fluid when the piston is in a rest position adjacent the end portion of the cylinder adjacent to the second set of control ports, the control ports of the second set of control ports being sequentially closed and opened by the piston as the piston is driven by pressurized fluid from the first set of control ports for a door closing stroke, the sequential closing of the control ports of the second set of control ports reducing the access of flow through the control ports to an exhaust fluid pressure and increasing back pressure applied to the piston opposite to the direction of movement thereof for a door closing stroke, the sequential opening of the control ports of the second set of control ports for a door closing stroke bypassing pressurized fluid from the first set of control ports to an exhaust fluid, the control ports of the second set of control ports being sequentially closed and opened by the piston as the piston is driven by pressurized fluid from the second set of control ports for a door opening stroke, the sequential closing of the second set of control ports reducing the bypassing of pressurized fluid in the respect to the piston or a door opening stroke, the sequential opening of the second set of control ports by the piston where a door opening stroke sequentially applying a slow pressurized fluid to the piston to accelerate the piston or a door opening stroke.

10. A pressurized fluid operating device in accordance with claim 9 in which the second set of control ports comprises a plurality of control ports spaced along the length of the cylinder with a predetermined interval therebetween.

11. A pressurized fluid operating device in accordance with claim 10 in which the plurality of control ports comprises at least three control ports.

12. A pressurized fluid operating device in accordance with claim 9 in which the piston is adapted to close more than one of the plurality of control ports of the second set of control ports as the piston is moved with respect to the second set of control ports on a door opening or a door closing stroke.

13. A pressurized fluid operating device according to claim 1 in which the piston has a pair of circumferential seals slidably engaged with the inner surface of the cylinder and spaced with respect to one another at a distance in the direction of the predetermined length of the piston which corresponds to the spacing along the length of the cylinder between at least two of the control ports to enable the piston to reduce the access of flow with respect to the control parts by blocking at least two of the control ports.

14. A pressurized fluid operating device in accordance with the claim 13 and further comprising means for venting the annular volume disposed between the inner surface of the cylinder and the outer surface of the piston and extending between the seals to at least one end of the piston.

15. A pressurized fluid operating device in accordance with claim 1 in which the piston when in one rest position thereof is adapted to block one of the sets of a plurality of control ports.

16. A pressurized fluid operating device in accordance with claim 12 in which the piston in the other rest position thereof is disposed between the cylinder head adjacent thereto and the other set of a plurality of ports with the control ports thereof open to the interior of the cylinder.

17. A pressurized fluid operating device in accordance with claim 1 and further comprising an additional elongated piston rod extending from the other end of the piston, and in which the other of the pair of cylinder heads has an opening therein for forming a sealable and slideable fit with the additional piston rod extending therethrough, the piston rod and the additional piston rod maintaining a uniform displacement of pressurized fluid adjacent each of the opposite ends of the piston for an incremental movement thereof and enabling each of the opposite ends of the piston to be coupled to the door.

18. A pressurized fluid operating device in accordance with claim 1 in which each of the sets of a plurality of control ports extending for a predetermined distance along the length of the cylinder comprises more than one control port disposed circumferentially with respect to the set adjacent at least some of the plurality of ports within the set.

19. A pressurized fluid operating device in accordance with claim 1 and further comprising means disposed within the cylinder between an end portion thereof and the set of a plurality of ports adjacent thereto and beyond the path of travel of the piston for preventing a flow of fluid from the cylinder and through the end port adjacent the end portion as the piston approaches its rest position adjacent thereto and for passing a flow of fluid from the end port and toward the end of the piston adjacent thereto.

20. A pressurized device in accordance with claim 19 in which the means for preventing a flow of fluid from the cylinder and through the end port and for passing a flow of fluid from the end port and toward the end of the piston adjacent thereto comprises a check valve.

21. A pressurized fluid operating device in accordance with claim 1 and further comprising means disposed within the cylinder between each end portion thereof and the set of a plurality of ports adjacent thereto and beyond the path of travel of the piston for preventing a flow of fluid from the cylinder and through the end port adjacent the end portion as the piston approaches its rest position adjacent thereto and for passing a flow of fluid from the end port and toward the end of the piston adjacent thereto.

22. A pressurized device in accordance with claim 21 in which each of the means for preventing a flow of fluid from the cylinder and through the end port and for passing a flow of fluid from the end port and into the cylinder and toward the end of the piston adjacent thereto comprises a check valve.

23. A pressurized fluid operating device in accordance with claim 1 in which at least a portion of the control ports of each of the sets are uncovered when the piston is in each rest position, the piston in response to fluid pressure connected to one of the pair of end ports initially being adapted to be moved from a rest position adjacent one end of the cylinder toward the central position of the cylinder while the one set of control ports spaced adjacent to the one end position of the cylinder is adapted to bypass a portion of the flow from the source of fluid pressure around the piston, the piston when subsequently being moved to intersect progressively the control ports of the one set of ports progressively reducing the bypassing of the portion of the flow and thereby being accelerated within the cylinder, the piston when moving into the central portion of the cylinder and progressively beyond the control ports of the one set of ports reaching a maximum velocity, the piston when progressively intersecting the control ports of the other set of control ports being subjected to a decelerating force exerted by fluid back pressure resulting from the flow of fluid through the other set of control ports being progressively intersected by the piston, and the piston when being decelerated moving to the other end portion of the cylinder to a rest position adjacent thereto.

24. A pressurized fluid operating device in accordance with claim 1 in which the cylinder has closed wall portions each extending for a predetermined distance from a different opposite end portion of the cylinder toward the central portion of the cylinder to form dwell regions within the cylinder, the predetermined distance being at least equal to the predetermined lengths of the piston, the first and second sets of a plurality of control ports in communication with the interior of the cylinder each extending for a predetermined distance along the length of the cylinder from a different one of the dwell regions of the cylinder toward the central portion thereof, and the piston in response to fluid pressure connected by a passage to one of the end ports initially being adapted to be moved from a rest position adjacent one end of the cylinder and through the one dwell region adjacent thereto toward the central portion of the cylinder while the one set of control ports adjacent to the one dwell region being adapted to bypass a portion of the flow from the source of fluid pressure around the piston, the piston when subsequently being moved to beyond the one dwell region to intersect the control ports of the one set of control ports progressively reducing the bypassing of the portion of the flow and thereby being accelerated within the cylinder, the piston when moving into the central portion of the cylinder and progressively beyond the control ports of the one set of control ports reaching a maximum velocity, the piston when progressively intersecting the control ports of the other set of control ports being subjected to a decelerating force exerted by fluid back pressure resulting from the flow of fluid through the other set of control ports being intersected by the piston, and the piston when being decelerated passing into the dwell region of the cylinder to a rest position adjacent thereto.

25. A pressurized fluid operating device according to claim 1 further comprising a pump for providing pressurized fluid to the device comprising a pump housing having a pump chamber therein, a rotatable pumping element disposed in the pump chamber, the housing having a pair of passages extending from the pump chamber to the exterior of the pump housing, the passages being adapted to be connected to a pressurized fluid operating device, and means for driving the pump element in rotation, the pump element being adapted to deliver pressurized fluid to either one of the pair of passages as determined by the sense of rotation of the pump element, the other one of the passages receiving the exhaust flow of pressurized fluid, and a pair of pressure responsive bypass valves each being connected to a different one of the pair of passages in the pump housing, each of the pair of bypass valves being adapted to bypass pressurized fluid at a predetermined pressure setting, each of the pair of bypass valves when connected to a passage receiving pressurized fluid from the pump cavity being adapted to bypass pressurized fluid to the pump chamber in response to pressure within the passage exceeding the predetermined pressure setting, whereby the predetermined pressure setting can be selected for each of the passages as determined by the sense of rotation of the pump element.

26. A pressurized fluid operating device according to claim 25 wherein the pump comprises means for selectively setting the predetermined pressure setting of each of the pair of bypass valves to enable the predetermined pressure to be relatively high pressure for rapid opening of a door by the pressurized fluid operating device and a relatively low pressure for slower closing of the door.

27. A pressurized fluid operating device according to claim 25 wherein the pump further comprises a shunt valve connected to the pump chamber for shunting the pressurized fluid being directed toward one of the passages back to the pump chamber to reduce the pressure of the pressurized fluid, and means responsive to a condition associated with the operation of the pressurized fluid operating device for actuating the shunt valve for shunting the pressurized fluid.

28. A pressurized fluid operating device according to claim 27 in which the means responsive to a condition associated with the operation of the pressurized fluid operating device for actuating the shunt valve for shunting of the pressurized fluid comprises a sensor responsive to a condition of abnormal operation of the door.

29. A pressurized fluid operating device in accordance with claim 1 in which one of the first and second sets of a plurality of control ports has at least some of the control ports therein having a smaller interval therebetween is the set of control ports through which pressurized fluid is delivered to the cylinder for closing the door and in which the other of the sets of a plurality of control ports having a greater interval between at least some of the control ports is the set of control ports through which pressurized fluid is delivered to the cylinder for opening the door.

30. A pressurized fluid operating device in accordance with claim 29 in which the length of the piston is adapted to block at least two of the control ports of the set of a plurality of control ports having the smaller interval therebetween.

31. A pressurized fluid operating device in accordance with claim 29 in which the length of the piston is adapted to block between one and two of the control ports of the set of a plurality of control ports having the greater interval therebetween.

32. A pressurized fluid operating device for opening and closing a door comprising:

an elongated cylinder, a piston of predetermined length slidingly disposed within the cylinder and an elongated piston rod extending from one end of the piston, a pair of cylinder heads each sealing a different opposite end portion of the cylinder, one of the cylinder heads having an opening therein for forming a sealable and slideable fit with the piston rod extending therethrough, the piston having a rest position adjacent each of the different opposite end portions of the cylinder and each rest position corresponding to a different one of the fully opened and fully closed conditions of the door, a pair of end ports each in communication with the interior of the cylinder adjacent a different opposite end portion thereof, each of the end ports being adapted to be connected alternately to a passage providing a source of fluid pressure to drive the piston along the length of the cylinder, the improvement comprising the cylinder having first and second sets of a plurality of control ports in communication with the interior of the cylinder, each of the sets of control ports extending for a predetermined distance along the length of the cylinder from adjacent a different opposite end portion of the cylinder toward a central portion thereof, the control ports in each set being spaced from one another along the length of the cylinder, the access of flow with respect to the control ports at one end of the cylinder being different from the access of flow with respect to the control ports at the opposite end of the cylinder, and means for alternately connecting one of the passages and one set of control ports adjacent thereto to a source of higher fluid pressure for operating the door while connecting the other of the passages and control ports adjacent thereto at the opposite end of the cylinder to an exhaust fluid pressure, the different accesses of flow with respect to the control ports giving different operating conditions for the opening and the closing of the door, the means for alternately connecting one of the passages and one set of control ports adjacent thereto to a source of higher fluid pressure for operating the door while connecting the other of the passages and control ports adjacent thereto at the opposite end of the cylinder to an exhaust fluid pressure comprising a pair of manifolds each having its exterior connected to a different one of the end ports and the set of control ports adjacent thereto, a conduit connecting the interior of each of the manifolds to one another, means connected to the conduit for enabling bypass of flow to the cylinder through the conduit during the door closing stroke to regulate the rate of closing and for reducing flow through the conduit during the door opening stroke to apply maximum flow to the cylinder.

33. A pressurized fluid operating device in accordance with claim 32 in which the means for enabling bypass of flow to the cylinder through the conduit during the door closing stroke comprises a check valve for passing the bypass flow through the conduit.

34. A pressurized fluid operating device in accordance with claim 32 and further comprising means for controlling the level of the bypass flow through the conduit to regulate the rate of closing.

* * * * *